United States Patent
Mengle

(10) Patent No.: US 9,511,873 B2
(45) Date of Patent: Dec. 6, 2016

(54) NOISE-REDUCING ENGINE NOZZLE SYSTEM

(75) Inventor: Vinod Govind Mengle, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 1184 days.

(21) Appl. No.: 13/416,964

(22) Filed: Mar. 9, 2012

(65) Prior Publication Data

US 2013/0232948 A1  Sep. 12, 2013

(51) Int. Cl.
| | |
|---|---|
| B64D 33/04 | (2006.01) |
| F02K 1/04 | (2006.01) |
| F02K 1/46 | (2006.01) |
| F02K 1/48 | (2006.01) |
| F02K 1/34 | (2006.01) |
| F02K 1/38 | (2006.01) |

(52) U.S. Cl.
CPC ............... B64D 33/06 (2013.01); F02K 1/04 (2013.01); F02K 1/386 (2013.01); F02K 1/46 (2013.01); F02K 1/48 (2013.01)

(58) Field of Classification Search
CPC .......... F02C 7/24; F05D 2260/96; F02K 1/34; F02K 1/46; F02K 1/82; F02K 1/827; F02K 1/48; F02K 1/04; B64D B64D 33/06
See application file for complete search history.

(56) References Cited

U.S. PATENT DOCUMENTS

| | | | |
|---|---|---|---|
| 3,721,389 A * | 3/1973 | MacKinnon et al. | ... 239/265.19 |
| 4,214,441 A * | 7/1980 | Mouritsen et al. | ............ 60/262 |
| 4,440,346 A | 4/1984 | Wiley | |
| 4,592,508 A | 6/1986 | Thornock | |
| 6,532,729 B2 * | 3/2003 | Martens | ........................ 60/204 |
| 6,935,098 B2 * | 8/2005 | Bardagi et al. | ................ 60/262 |
| 7,520,124 B2 | 4/2009 | Narayanan et al. | |
| 7,963,099 B2 * | 6/2011 | Renggli | ........................ 60/262 |
| 7,966,824 B2 | 6/2011 | Mengle | |

(Continued)

FOREIGN PATENT DOCUMENTS

| | | |
|---|---|---|
| AU | 2007203082 A1 | 8/2006 |
| CA | 2592676 A1 | 2/2008 |

(Continued)

OTHER PUBLICATIONS

Extended European Search Report, dated Jul. 25, 2013, regarding Application No. EP13158670.3, 8 pages.

(Continued)

*Primary Examiner* — Andrew Nguyen

(74) *Attorney, Agent, or Firm* — Yee & Associates, P.C.

(57) ABSTRACT

A method and apparatus for reducing noise generated during operation of an engine. In one illustrative embodiment, a nozzle system comprises a first nozzle and a second nozzle at least partially surrounded by the first nozzle. An outer surface of an aft portion of the second nozzle has a shape configured such that a radial cross-section of the outer surface of the aft portion of the second nozzle has a curve that is different from at least one other curve for another radial cross-section of the outer surface of the aft portion of the second nozzle and such that an axial cross-section of the outer surface of the aft portion of the second nozzle has a wavy shape.

23 Claims, 20 Drawing Sheets

(56) References Cited

U.S. PATENT DOCUMENTS

| | | | | |
|---|---|---|---|---|
| 2003/0213227 A1* | 11/2003 | Balzer | ............... | B64D 33/06 60/204 |
| 2007/0000234 A1* | 1/2007 | Anderson | ............... | 60/262 |
| 2007/0033922 A1* | 2/2007 | Reba et al. | ............... | 60/262 |
| 2008/0047273 A1* | 2/2008 | Au et al. | ............... | 60/770 |
| 2008/0078162 A1* | 4/2008 | Lefebvre et al. | ............... | 60/226.1 |
| 2008/0272228 A1* | 11/2008 | Mengle et al. | ............... | 244/54 |
| 2010/0108436 A1 | 5/2010 | Gilcreest et al. | | |
| 2011/0167786 A1* | 7/2011 | Marques | ............... | F02K 1/386 60/204 |

FOREIGN PATENT DOCUMENTS

| | | |
|---|---|---|
| CA | 2648765 A1 | 2/2010 |
| EP | 1482160 A1 | 12/2004 |
| EP | 1892405 A2 | 2/2008 |
| EP | 1995441 A2 | 11/2008 |
| GB | 2031070 A | 4/1980 |
| GB | 2082259 A | 3/1982 |

OTHER PUBLICATIONS

Mengle et al., "Reducing Propulsion Airframe Aeroacoustic Interactions with Uniquely Tailored Chevrons: 3. Jet-Flap Interaction," American Institute of Aeronautics and Astronautics, 12th AIAA/CEAS Aeroacoustics Conference, 27th AIAA Aeroacoustics Conference, May 2006, 15 pp.

Mengle et al., "Reducing Propulsion Airframe Aeroacoustic Interactions with Uniquely Tailored Chevrons: 1. Isolated Nozzles," American Institute of Aeronautics and Astronautics, 12th AIAA/CEAS Aeroacoustics Conference, 27th AIAA Aeroacoustics Conference, May 2008, 18 pp.

Mengle et al., "Reducing Propulsion Airframe Aeroacoustic Interactions with Uniquely Tailored Chevrons: 2. Installed Nozzles," American Institute of Aeronautics and Astronautics, 12th AIAA/CEAS Aeroacoustics Conference, 27th AIAA Aeroacoustics Conference, May 2008, 14 pp.

Mengle et al., "Flight Test Results for Uniquely Tailored Propulsion-Airframe Aeroacoustic Chevrons: Shockcell Noise," American Institute of Aeronautics and Astronautics, 12th AIAA/CEAS Aeroacoustics Conference, 27th AIAA Aeroacoustics Conference, May 2006, 17 pp.

Nesbitt et al., Flight Test Results for Uniquely Tailored Propulsion-Airframe Aeroacoustic Chevrons: Community Noise, American Institute of Aeronautics and Astronautics, 12th AIAA/CEAS Aeroacoustics Conference, 27th AIAA Aeroacoustics Conference, May 2006, 13 pp.

Massey et al., "Computational Analysis of a Chevron Nozzle Uniquely Tailored for Propulsion Airframe Aeroacoustics," American Institute of Aeronautics and Astronautics, 12th AIAA/CEAS Aeroacoustics Conference, 27th AIAA Aeroacoustics Conference, May 2006, 23 pp.

Mengle et al., "Relative Clocking of Enhanced Mixing Devices for Jet Noise Benefit," American Institute of Aeronautics and Astronautics, 12th AIAA/CEAS Aeroacoustics Conference, 27th AIAA Aeroacoustics Conference, May 2006, 14 pp.

Mengle et al., "Clocking Effect of Chevrons with Azimuthally-Varying Immersions on Shockcell/Cabin Noise," American Institute of Aeronautics and Astronautics, 12th AIAA/CEAS Aeroacoustics Conference, 27th AIAA Aeroacoustics Conference, May 2006, 14 pp.

Mengle, "Jet Noise Characteristics of Chevrons in Internally Mixed Nozzles," American Institute of Aeronautics and Astronautics, 12th AIAA/CEAS Aeroacoustics Conference, 27th AIAA Aeroacoustics Conference, May 2006, 15 pp.

Salikuddin et al., "Acoustic and Aero-Mixing Experimental Results for Fluid Shield Scale Model Nozzles," National Aeronautics and Space Administration, Feb. 2005, 632 pp.

* cited by examiner

NOISE-REDUCING ENGINE NOZZLE SYSTEM

BACKGROUND INFORMATION

1. Field:

The present disclosure relates generally to engines and, in particular, to a method and apparatus for reducing noise generated during operation of an engine. Still more particularly, the present disclosure relates to a method and apparatus for reducing noise generated by the exhaust jet of an engine.

2. Background:

An aircraft may generate different types of noise during different phases of flight. These different phases of flight may include taxiing, takeoff, landing, cruising, ascending, descending, and/or other phases of flight. In some cases, the noise generated by an aircraft may be undesirable to the passengers and/or crew onboard the aircraft. For example, noise generated during a cruise phase of flight may be undesirable to the passengers and/or crew of an aircraft.

One source of the noise generated during operation of an aircraft may be the operation of an engine of the aircraft. In particular, the flow of exhaust exiting an engine of an aircraft during operation of the engine may contribute to the undesirable noise produced during operation of an aircraft. The flow of exhaust exiting an engine is referred to as an exhaust jet. The exhaust jet is a stream of exhaust gases that flow out of the engine through a nozzle system for the engine. This stream of gases is used to move the aircraft. The pattern with which the exhaust jet flows out of the nozzle system may be referred to as an exhaust plume.

When the exhaust jet exits the nozzle system at supersonic speeds and when the exhaust jet exiting the nozzle has a pressure that is different from the pressure of the ambient air around the exhaust jet, a shock-cell pattern may form in the exhaust jet. This shock-cell pattern may be one factor that contributes to the noise generated during operation of an engine of an aircraft. The noise associated with this shock-cell pattern is referred to as shock-associated broadband noise or shock-cell noise.

A number of different mechanisms have been used to reduce the amount of noise generated during operation of an engine. These mechanisms include adding chevrons and/or serrations to one or more nozzles in the nozzle system for the engine. However, these currently available mechanisms for reducing the noise generated by an engine may not reduce the noise to within selected tolerances. In particular, currently available mechanisms may not reduce the shock-cell noise generated by an engine during a cruise phase of flight to within selected tolerances.

Therefore, it would be desirable to have a method and apparatus that takes into account one or more of the issues discussed above as well as possibly other issues.

SUMMARY

In one illustrative embodiment, a nozzle system comprises a first nozzle and a second nozzle at least partially surrounded by the first nozzle. An outer surface of an aft portion of the second nozzle has a shape configured such that a radial cross-section of the outer surface of the aft portion of the second nozzle has a curve that is different from at least one other curve for another radial cross-section of the outer surface of the aft portion of the second nozzle and such that an axial cross-section of the outer surface of the aft portion of the second nozzle has a wavy shape.

In another illustrative embodiment, an engine comprises a housing and a nozzle system at an aft end of the housing for the engine. The nozzle system comprises a fan nozzle and a core nozzle. The core nozzle is at least partially surrounded by the fan nozzle. An outer surface of an aft portion of the core nozzle has a shape that is selected to reduce noise generated during operation of the engine. The shape of the outer surface of the aft portion of the core nozzle is configured such that a radial cross-section of the outer surface of the aft portion of the core nozzle has a curve that is different from at least one other curve for another radial cross-section of the outer surface of the aft portion of the core nozzle and such that an axial cross-section of the outer surface of the aft portion of the second nozzle has a wavy shape.

In yet another illustrative embodiment, a method for reducing noise generated by an engine is provided. The engine is operated. The engine has a nozzle system comprising a first nozzle and a second nozzle. The second nozzle is at least partially surrounded by the first nozzle. An outer surface of an aft portion of the second nozzle has a shape configured such that a radial cross-section of the outer surface of the aft portion of the second nozzle has a curve that is different from at least one other curve for another radial cross-section of the outer surface of the aft portion of the second nozzle. The noise generated during operation of the engine is reduced using the second nozzle of the nozzle system and such that an axial cross-section of the outer surface of the aft portion of the second nozzle has a wavy shape.

The features, functions, and benefits can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the different illustrative embodiments recognize and take into account that noise, including shock-cell noise, produced by an engine during operation of an aircraft may be undesirable. The noise produced by an engine of an aircraft may be undesirable to the passengers and/or crew onboard the aircraft while the aircraft is in flight.

The different illustrative embodiments recognize and take into account that it may be desirable to have a nozzle system that is configured to reduce noise, and in particular, shock-cell noise, to within selected tolerances. Thus, the different illustrative embodiments provide a method and apparatus for reducing noise generated during operation of an engine.

Figure 1:
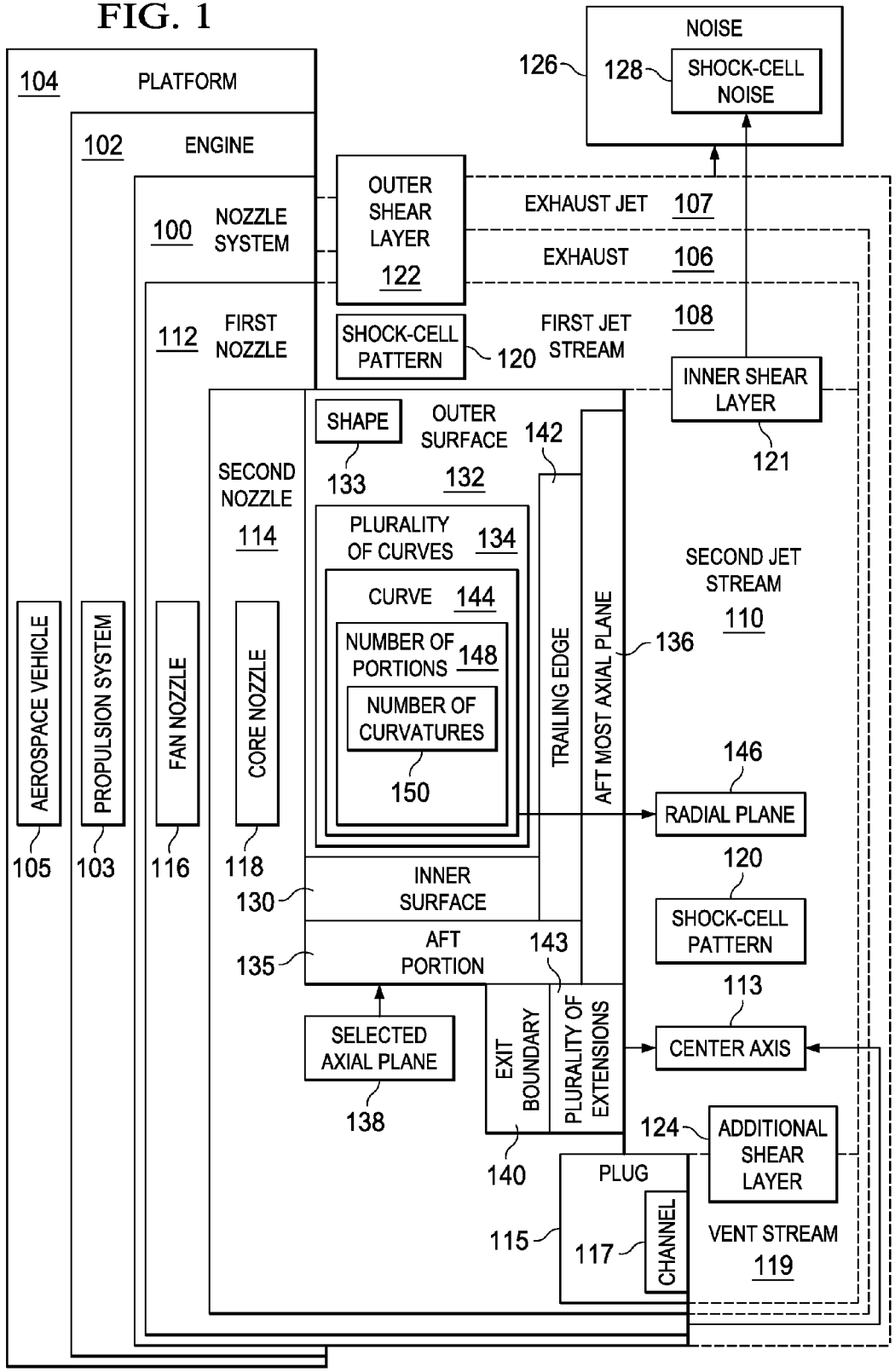
FIG. 1 is an illustration of a nozzle system for an engine in accordance with an illustrative embodiment.

Referring now to the figures, and in particular, with reference to FIG. 1, an illustration of a nozzle system for an engine is depicted in the form of a block diagram in accordance with an illustrative embodiment. In these illustrative examples, nozzle system 100 is part of engine 102.

Engine 102 may be configured for use in platform 104. In these illustrative examples, platform 104 is aerospace vehicle 105. Aerospace vehicle 105 may be selected from one of an aircraft, a jet aircraft, a missile, a spacecraft, a space shuttle, or some other suitable type of vehicle configured for travel in air and/or space. Of course, in other illustrative examples, platform 104 may be some other suitable type of mobile platform configured to move using engine 102. In still other illustrative examples, engine 102 may be configured for use in a stationary platform. For example, engine 102 may be used in a power generation system.

As depicted, engine 102 may take the form of propulsion system 103 when platform 104 is aerospace vehicle 105. As used herein, a "propulsion system" is any system configured to produce thrust to push an object forward. For example, engine 102 may be a jet engine. More specifically, engine 102 may be a turbofan engine. Of course, in other illustrative examples, engine 102 may be a turbojet engine, a rocket engine, or some other suitable type of propulsion system for aerospace vehicle 105.

Propulsion system 103 is configured to generate and expel exhaust 106 through nozzle system 100 to generate the thrust needed to move platform 104. The flow of exhaust 106 exiting nozzle system 100 is exhaust jet 107 in these illustrative examples. The shape and/or pattern of exhaust jet 107 exiting nozzle system 100 may be referred to as the exhaust plume for propulsion system 103.

As depicted in these examples, exhaust jet 107 comprises first jet stream 108 and second jet stream 110 that exit propulsion system 103 through nozzle system 100 at substantially the same time. First jet stream 108 is a first flow of exhaust 106 that exits propulsion system 103 through first nozzle 112 of nozzle system 100. Second jet stream 110 is a second flow of exhaust 106 that exits propulsion system 103 through second nozzle 114 of nozzle system 100.

In these illustrative examples, first nozzle 112 may be fan nozzle 116. Further, second nozzle 114 may be core nozzle 118 in these examples. In some cases, second nozzle 114 may be referred to as a primary nozzle, while first nozzle 112 may be referred to as a secondary nozzle. In still other illustrative examples, first nozzle 112 may be fan nozzle 116, while second nozzle 114 may be a vent nozzle associated with a core nozzle. This vent nozzle may be referred to as a tertiary nozzle or a tertiary vent nozzle.

First nozzle 112 at least partially surrounds second nozzle 114. In other words, second nozzle 114 may be located within first nozzle 112. In one illustrative example, second nozzle 114 is nested within first nozzle 112. In other words, first nozzle 112 and second nozzle 114 may be substantially concentric to each other. For example, center axis 113 may be a center axis for both first nozzle 112 and second nozzle 114. Of course, in other illustrative examples, center axis 113 may only be a center axis for second nozzle 114, and first nozzle 112 may have a different center axis substantially parallel to but offset from center axis 113.

Depending on the implementation, first nozzle 112 may extend downstream of second nozzle 114 or second nozzle 114 may extend downstream of first nozzle 112. When platform 104 is aerospace vehicle 105, "downstream," as used herein, is towards an aft end of aerospace vehicle 105. As used herein, "upstream" is towards a forward end of aerospace vehicle 105.

In some illustrative examples, nozzle system 100 may include plug 115 in addition to first nozzle 112 and second nozzle 114. When nozzle system 100 includes plug 115, plug 115 is nested within second nozzle 114. In other words, plug 115 may share center axis 113 with first nozzle 112 and second nozzle 114. Of course, in other illustrative examples, plug 115 may have a different center axis that is substantially parallel to but offset from center axis 113.

Depending on the implementation, plug 115 may have channel 117. Channel 117 may be present in plug 115 to vent gases generated by propulsion system 103. This flow of gases exiting channel 117 in plug 115 is vent stream 119.

In these illustrative examples, with second nozzle 114 located within first nozzle 112, second jet stream 110 is surrounded by first jet stream 108 as these two jet streams exit nozzle system 100. Inner shear layer 121 is formed at the interface between first jet stream 108 and second jet stream 110. Outer shear layer 122 is formed at the interface between first jet stream 108 and the air around exhaust jet 107. In some cases, outer shear layer 122 may be at least partially formed by a mixture of first jet stream 108 and second jet stream 110, as well as the air around exhaust jet 107. Further, when nozzle system 100 includes plug 115 and plug 115 includes channel 117, additional shear layer 124 is formed between first jet stream 108 and vent stream 119.

During operation of propulsion system 103, first jet stream 108 and/or second jet stream 110 may exit nozzle system 100 at speeds greater than the speed of sound. At supersonic speeds, shock-cell pattern 120 may form within first jet stream 108 and/or second jet stream 110. Shock-cell pattern 120 comprises shock-cells, also referred to as shock diamonds or shock-cell diamonds, within exhaust jet 107 that may be visible. Shock-cells or shock-cell diamonds are a formation of stationary wave patterns that appear in a jet stream.

Shock-cell pattern 120 is formed when a jet stream that exits nozzle system 100 is supersonic and is either over-expanded or under-expanded. The jet stream is over-expanded when the static pressure of the jet stream exiting a nozzle is less than the static pressure of the flow of air and/or exhaust surrounding that jet stream. The jet stream is under-expanded when the pressure of the jet stream exiting the nozzle is greater than the pressure of the flow of air and/or exhaust surrounding that jet stream. Typically, a jet stream may be under-expanded at cruise conditions at high altitudes.

When a jet stream is either over-expanded or under-expanded, the pressure in the jet stream where the jet stream exits nozzle system 100 begins either compressing or expanding. When the jet stream is first jet stream 108, compression or expansion waves are formed that reflect between outer shear layer 122 and inner shear layer 121 in a manner that causes shock-cells to form in first jet stream 108. When second jet stream 110 encounters a similar situation, shock-cells are formed in second jet stream 110.

When shock-cell pattern 120 is formed within first jet stream 108 and/or second jet stream 110, noise 126 generated during operation of propulsion system 103 includes shock-cell noise 128. Noise 126 is the noise associated with the flow of exhaust 106 from nozzle system 100. In other words, noise 126 is the noise associated with exhaust jet 107 exiting nozzle system 100. In some illustrative examples, shock-cell noise 128 also may be referred to as shock-associated broadband noise.

Nozzle system 100 is configured to reduce noise 126, and in particular, shock-cell noise 128, to within selected tolerances. As one illustrative example, second nozzle 114 of nozzle system 100 is configured to reduce shock-cell noise 128 generated during a cruise phase of flight for aerospace vehicle 105 to within selected tolerances. Of course, in other illustrative examples, nozzle system 100 may be configured to reduce shock-cell noise 128 generated during other phases of flight.

As depicted in FIG. 1, second nozzle 114 has inner surface 130 and outer surface 132. Further, in these illustrative examples, second nozzle 114 includes plurality of extensions 143 configured to extend aftwards from exit boundary 140 along outer surface 132. Each extension in plurality of extensions 143 may have a base that lies along exit boundary 140 of outer surface 132 and a tip located downstream of exit boundary 140.

Plurality of extensions 143 may be referred to as, for example, without limitation, serrations or chevrons. Depending on the implementation, these extensions may have a trapezoidal shape, a triangular shape, or some other suitable type of shape. Plurality of extensions 143 may be configured to reduce noise 126.

In these illustrative examples, plurality of extensions 143 may be part of aft portion 135 of second nozzle 114. Aft portion 135 of second nozzle 114 is the portion of second nozzle 114 between selected axial plane 138 through second nozzle 114 and aftmost axial plane 136 through second nozzle 114. As used herein, an "axial plane" through second nozzle 114, such as aftmost axial plane 136 or selected axial plane 138, is a plane through second nozzle 114 that is substantially perpendicular to center axis 113 through second nozzle 114.

Selected axial plane 138 may be any axial plane through second nozzle 114 that is located upstream of plurality of extensions 143. In other words, none of the extensions in plurality of extensions 143 may have a portion located upstream of selected axial plane 138. In some cases, exit boundary 140 from which plurality of extensions 143 extend may be contained within a single axial plane through second nozzle 114. In other illustrative examples, exit boundary 140 may span more than one axial plane through second nozzle 114.

Aftmost axial plane 136 is the axial plane through second nozzle 114 located at the aftmost portion of trailing edge 142 of second nozzle 114. Trailing edge 142 is the aft edge where second nozzle 114 ends. At least a portion of trailing edge 142 is formed by the aft edges of the extensions in plurality of extensions 143. Aftmost axial plane 136 may be the axial plane through the aftmost tip of the tips of plurality of extensions 143.

In these illustrative examples, outer surface 132 of aft portion 135 of second nozzle 114 has shape 133 configured to reduce shock-cell noise 128. Additionally, shape 133 of the portion of outer surface 132 between selected axial plane 138 and aftmost axial plane 136 may be configured to reduce drag on second nozzle 114.

In particular, shape 133 of the portion of outer surface 132 between selected axial plane 138 and aftmost axial plane 136 is configured such that a radial cross-section of this portion of outer surface 132 through second nozzle 114 is curved. As used herein, "radial cross-section" through second nozzle 114 is a cross-section through a radial plane through second nozzle 114. Further, a "radial plane" through second nozzle 114, as used herein, is any plane through second nozzle 114 that includes center axis 113. In other words, a radial plane is a plane in which center axis 113 lies.

In these illustrative examples, shape 133 is configured such that a radial cross-section of the portion of outer surface 132 between selected axial plane 138 and aftmost axial plane 136 has a curve that is different from at least one other curve for another radial cross-section of the portion of outer surface 132 between selected axial plane 138 and aftmost axial plane 136.

In this manner, shape 133 of the portion of outer surface 132 within aft portion 135 of second nozzle 114 is configured such that different radial cross-sections of this portion of outer surface 132 may have different curves. Further, in these illustrative examples, any radial cross-section of the portion of outer surface 132 located upstream of selected axial plane 138 of second nozzle 114 may not be curved. Instead, this radial cross-section may be substantially linear.

An "axial cross-section" through second nozzle 114, as used herein, is a cross-section through an axial plane through second nozzle 114. When second nozzle 114 has plurality of extensions 143, axial cross-sections of outer surface 132 of second nozzle 114 at and upstream of exit boundary 140 are continuous. Further, axial cross-sections of outer surface 132 of second nozzle 114 downstream of exit boundary 140 may be discontinuous.

In these illustrative examples, shape 133 of the portion of outer surface 132 of second nozzle 114 between selected axial plane 138 and trailing edge 142 causes different axial cross-sections of outer surface 132 through aft portion 135 of second nozzle 114 to be non-circular, and in some cases, non-symmetrical. In particular, an axial cross-section of outer surface 132 along an axial plane between selected axial plane 138 and trailing edge 142 may be non-axisymmetrical. Shape 133 is configured such that the axial cross-section of outer surface 132 along an axial plane between selected axial plane 138 and aftmost axial plane 136 has a wavy shape.

In particular, the axial cross-section of outer surface 132 between selected axial plane 138 and aftmost axial plane 136 may be a wavy shape comprising at least one of hills and valleys with respect to center axis 113 through second nozzle 114. In other words, the axial cross-section of outer surface 132 may have a wavy shape that comprises hills, valleys, or a combination of the two when viewed from center axis 113.

When the axial cross-section of outer surface 132 of aft portion 135 of second nozzle 114 is taken along an axial plane downstream of the most forward portion of exit boundary 140, the wavy shape may be discontinuous. Depending on the implementation, only hills or only valleys may be seen with this type of axial cross-section.

Curve 144 is an example of a curve for a radial cross-section of outer surface 132 of aft portion 135 of second nozzle 114. In these illustrative examples, curve 144 is for the radial cross-section of outer surface 132 of aft portion 135 of second nozzle 114 along radial plane 146. Curve 144 begins at selected axial plane 138 and ends at trailing edge 142.

Curve 144 may have number of portions 148 with number of curvatures 150. As used herein, a "number of" items means one or more items. For example, number of portions 148 means one or more portions. Each portion in number of portions 148 has a corresponding curvature in number of curvatures 150.

As used herein, a "curvature" of a curve, such as curve 144, at any point, P, along curve 144 is defined as the reciprocal of the radius of the circle that most closely approximates curve 144 at or near that point, P. This circle may be referred to as an "osculating circle." The curvature of this point, P, is the rate of change of the angle of the tangent at the point, P, on curve 144 per unit length of curve 144.

When the osculating circle tangential to the point, P, along curve 144 is located on the side of curve 144 facing center axis 113, the curvature at this point, P, may be referred to as being "convex," with respect to the flow over outer surface 132. When the osculating circle tangential to the point, P, along curve 144 is located on the side of curve 144 facing first nozzle 112, the curvature at this point, P, may be referred to as being "concave," with respect to the flow over outer surface 132. In this manner, the different curvatures along curve 144 may be concave curvatures, convex curvatures, or some combination of the two.

In one illustrative example, the curvature at all points along curve 144 may be the same. In another illustrative example, the curvature at different points along curve 144 may be different. In some cases, the curvature along curve 144 may continuously change between selected axial plane 138 and trailing edge 142. In this manner, shape 133 for outer surface 132 of aft portion 135 of second nozzle 114 may take a number of different forms, depending on the implementation.

In the different illustrative examples, shape 133 formed by the different curvatures selected for the different curves for outer surface 132 of aft portion 135 of second nozzle 114 are selected to reduce shock-cell noise 128 to within selected tolerances. In particular, when platform 104 is aerospace vehicle 105, shape 133 may be selected to reduce shock-cell noise 128 associated with shock-cell pattern 120 in first jet stream 108 and/or second jet stream 110 to within selected tolerances during a cruise phase of flight and/or other phases of flight for aerospace vehicle 105.

In some illustrative examples, an outer surface of an aft portion of first nozzle 112 may have a shape configured similar to shape 133 of outer surface 132 of aft portion 135 of second nozzle 114. This shape may be configured to reduce shock-cell noise 128 if shock-cells are formed in the air around first jet stream 108 when aerospace vehicle 105 is travelling at supersonic speeds.

For example, first nozzle 112 may have a plurality of extensions. When first nozzle 112 has the plurality of extensions, the shape of the outer surface of an aft portion of first nozzle 112 may be configured such that a particular curve for a radial cross-section of the outer surface of first nozzle 112 through first nozzle 112 is different from a curve for at least one other radial cross-section of the outer surface of first nozzle 112.

In still other illustrative examples, when nozzle system 100 includes plug 115 with channel 117, an outer surface of an aft portion of plug 115 may have a shape similar to shape 133 of outer surface 132 of aft portion 135 of second nozzle 114. This shape may be configured to reduce shock-cell noise 128 associated with second jet stream 110.

For example, plug 115 may have a plurality of extensions. When plug 115 has the plurality of extensions, the shape of the outer surface of an aft portion of plug 115 may be configured such that a particular curve for a radial cross-section of the outer surface of plug 115 through plug 115 is different from a curve for at least one other radial cross-section of the outer surface of plug 115.

In this manner, the shapes of the outer surfaces of the different nozzles in nozzle system 100 may be configured in a number of different ways to reduce shock-cell noise 128 to within selected tolerances. In particular, the outer surface of the aft portion of at least one of first nozzle 112, second nozzle 114, and plug 115 may have a shape configured to reduce shock-cell noise 128.

The illustration of nozzle system 100 in FIG. 1 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, nozzle system 100 may not include plug 115. In other illustrative examples, second nozzle 114 may not have plurality of extensions 143. In some cases, the different extensions in plurality of extensions 143 may have different lengths taken from the base to the tip of an extension.

In other illustrative examples, a third nozzle may be associated with second nozzle 114. This third nozzle may be a vent nozzle associated with outer surface 132 of second nozzle 114. Depending on the implementation, an outer surface of an aft portion of this third nozzle may have a shape configured similar to shape 133 for outer surface 132 of aft portion 135 of second nozzle 114. The shape of the outer surface of the aft portion of this third nozzle may be configured to help reduce shock-cell noise 128.

In some cases, different curves for outer surface 132 of aft portion 135 of second nozzle 114 along different radial planes through second nozzle 114 may begin at different selected axial planes through second nozzle. For example, in one illustrative example, one curve may begin at selected axial plane 138 and another curve may begin at an axial plane located downstream of selected axial plane 138.

Figure 2:
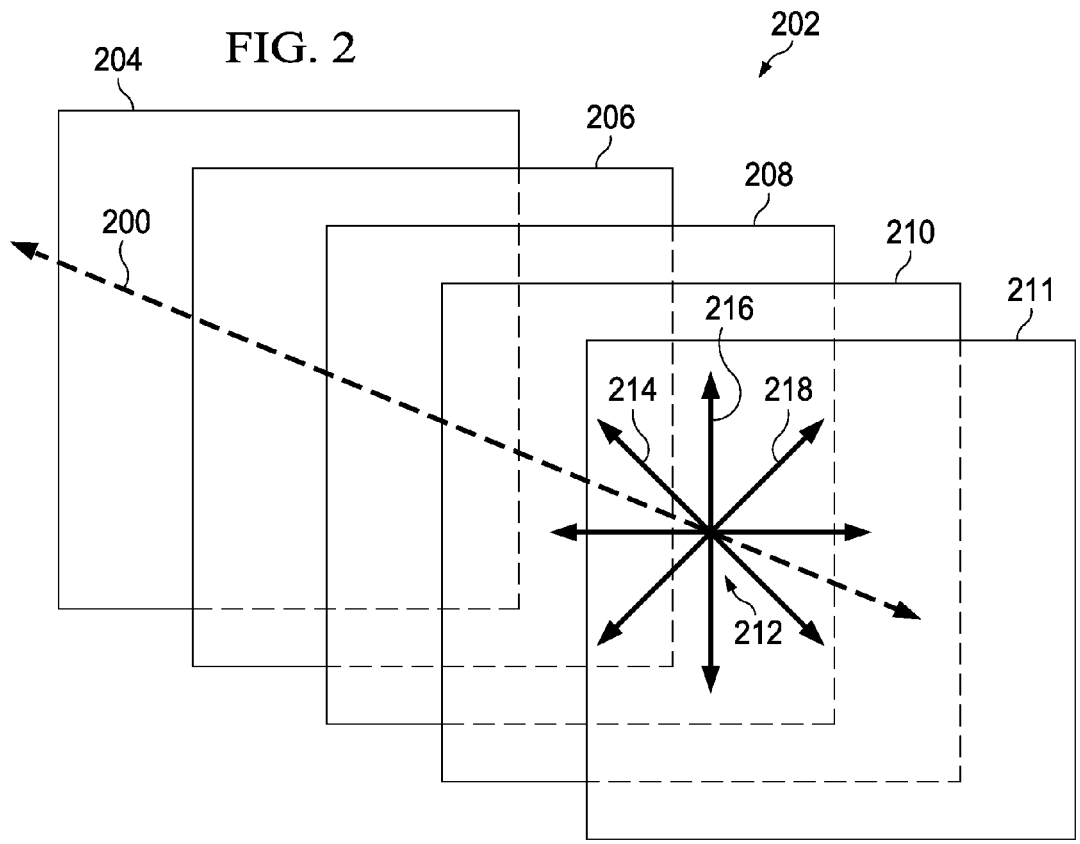
FIG. 2 is an illustration of a center axis for nozzle system and different axial planes and radial axes relative to the center axis in accordance with an illustrative embodiment.

With reference now to FIG. 2, an illustration of a center axis for nozzle system and different axial planes and radial axes relative to the center axis is depicted in accordance with an illustrative embodiment. In this depicted example, center axis 200 is an example of center axis 113 in FIG. 1. In this manner, center axis 200 may be a center axis for nozzle system 100 in FIG. 1. For example, first nozzle 112, second nozzle 114, and plug 115 in FIG. 1 may be substantially concentric to each other with respect to center axis 113.

Axial planes 202 are planes perpendicular to center axis 200. Axial planes 202 include axial plane 204, axial plane 206, axial plane 208, axial plane 210, and axial plane 211. Axial plane 204 may be an example of selected axial plane 138 in FIG. 1. Axial plane 211 may be an example of aftmost axial plane 136 in FIG. 1. In one illustrative example, exit boundary 140 in FIG. 1 may be contained within axial plane 210.

Axial cross-sections of outer surface 132 of aft portion 135 of second nozzle 114 in FIG. 1 taken along axial planes 202 may appear non-circular and non-symmetrical when outer surface 132 of aft portion 135 of second nozzle 114 has shape 133 in FIG. 1. However, axial cross-sections of outer surface 132 of second nozzle 114 in FIG. 1 taken along any axial planes through second nozzle 114 upstream of axial plane 204 may appear substantially circular and symmetrical.

As depicted, radial axes 212 are axes that intersect center axis 200. Radial axes 212 include radial axis 214, radial axis 216, and radial axis 218. The plane formed by one of these radial axis and center axis 200 is referred to as a radial plane. For example, the plane formed by radial axis 214 and center axis 200 is an example of one implementation for radial plane 146 in FIG. 1.

When outer surface 132 of aft portion 135 of second nozzle 114 has shape 133 in FIG. 1, the radial cross-sections of outer surface 132 of aft portion 135 may have different curves. For example, the radial cross-section of outer surface 132 of aft portion 135 of second nozzle 114 taken along the radial plane formed by radial axis 214 and center axis 200 may have a curve that is different from the curve for the radial cross-section of outer surface 132 of aft portion 135 of second nozzle 114 along the radial plane formed by radial axis 216 and center axis 200.

In other illustrative examples, axial planes 202 and the radial planes formed by radial axes 212 and center axis 200 may be for first nozzle 112 in FIG. 1. In still other illustrative examples, axial planes 202 and the radial planes formed by radial axes 212 and center axis 200 may be for a plug, such as plug 115 in FIG. 1, instead of a nozzle.

Figure 3:
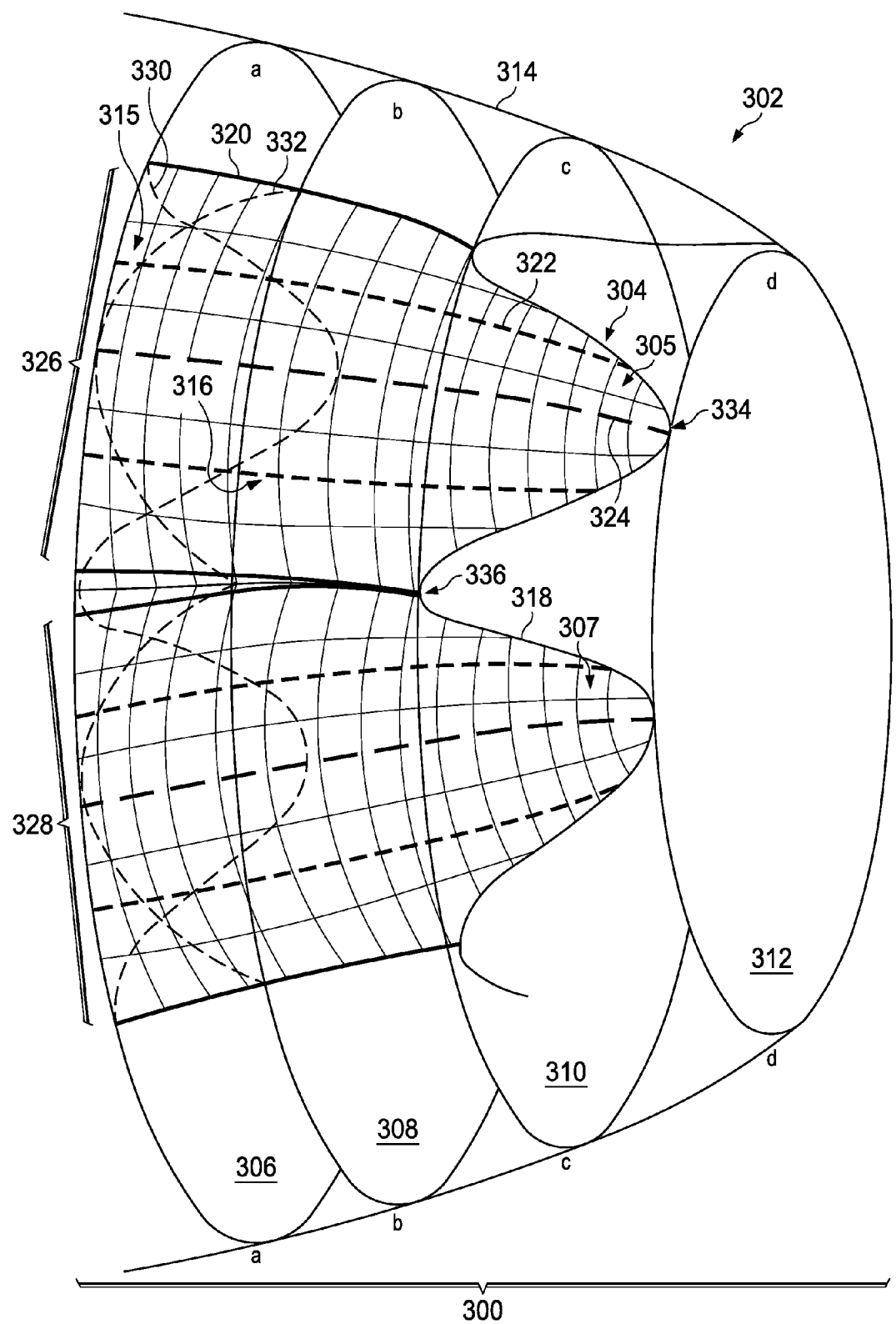
FIG. 3 is an illustration of a shape for the outer surface of a nozzle in accordance with an illustrative embodiment.

Turning now to FIG. 3, an illustration of a shape for the outer surface of a nozzle is depicted in accordance with an illustrative embodiment. In this illustrative example, aft portion 300 of core nozzle 302 is a representation of one example of an implementation for aft portion 135 of core nozzle 118 in FIG. 1. As depicted, core nozzle 302 has plurality of extensions 304. Plurality of extensions 304 includes extension 305 and extension 307.

Axial plane 306, axial plane 308, axial plane 310, and axial plane 312 are axial planes through aft portion 300 of core nozzle 302. Axial plane 306 is an example of selected axial plane 138 in FIG. 1. Axial plane 312 is an example of aftmost axial plane 136 in FIG. 1. Aft portion 300 of core nozzle 302 is the portion of core nozzle 302 between axial plane 306 and axial plane 312.

In this illustrative example, outer surface 314 of aft portion 300 of core nozzle 302 has shape 315. Shape 315 is configured such that different radial cross-sections of outer surface 314 have different curves. In this illustrative example, shape 315 is configured such that portion 326 of outer surface 314 has substantially the same shape as portion 328 of outer surface 314.

Curves 316 are examples of curves for outer surface 314 of aft portion 300 of core nozzle 302 along different radial planes through core nozzle 302. As depicted in this example, all of curves 316 for outer surface 314 begin at axial plane 306 and end at trailing edge 318 of core nozzle 302. Curve 320, curve 322, and curve 324 are examples of curves 316. These three curves lie along different radial planes through core nozzle 302.

In this illustrative example, the different curvatures along the different curves for the portion of outer surface 314 at and near tip 334 of extension 305 are selected such that an axial cross-section of this portion of outer surface 314 at and near tip 334 of extension 305 appears as a hill. Further, the different curvatures along the different curves for the portion of outer surface 314 at and near interface 336 between extension 305 and extension 307 are selected such that an axial cross-section of this portion of outer surface 314 at and near interface appears 336 as a valley.

In this illustrative example, shape 315 is configured such that the curvature along a curve in curves 316 is different from the curvature along other curves in curves 316 beginning at axial plane 306. However, in other illustrative examples, outer surface 314 of aft portion 300 of core nozzle 302 may have a shape configured such that all curves along all radial planes through core nozzle 302 have the same selected curvature between axial plane 306 and boundary 330. In other words, in these other illustrative examples, outer surface 314 of aft portion 300 may have a shape configured such that the curvatures along curve 320, curve 322, and curve 324 are the same up until boundary 330 and different downstream of boundary 330 up until trailing edge 318.

In still other illustrative examples, outer surface 314 of aft portion 300 of core nozzle 302 may have a shape configured such that all curves along all radial planes through core nozzle 302 have the same selected curvature between axial plane 306 and boundary 332. In other words, in these other illustrative examples, outer surface 314 of aft portion 300 may have a shape configured such that the curvatures along curve 320, curve 322, and curve 324 are the same up until boundary 332 and different downstream of boundary 330 up until trailing edge 318. With reference now to FIGS. 4-20, illustrations of different configurations for a nozzle system for an engine are depicted in accordance with an illustrative embodiment. Engine 400 in FIGS. 4-20 may be implemented in an aerospace vehicle, such as aerospace vehicle 105 in FIG. 1. Engine 400 may be an example of engine 102 in FIG. 1. In particular, engine 400 may be implemented in a jet aircraft. In these illustrative examples, engine 400 is a turbofan engine. The different configurations for nozzle system 403 for engine 400 are selected to reduce noise generated by engine 400 during operation of engine 400. More specifically, these different configurations for nozzle system 403 are selected to reduce shock-cell noise.

Figure 4:
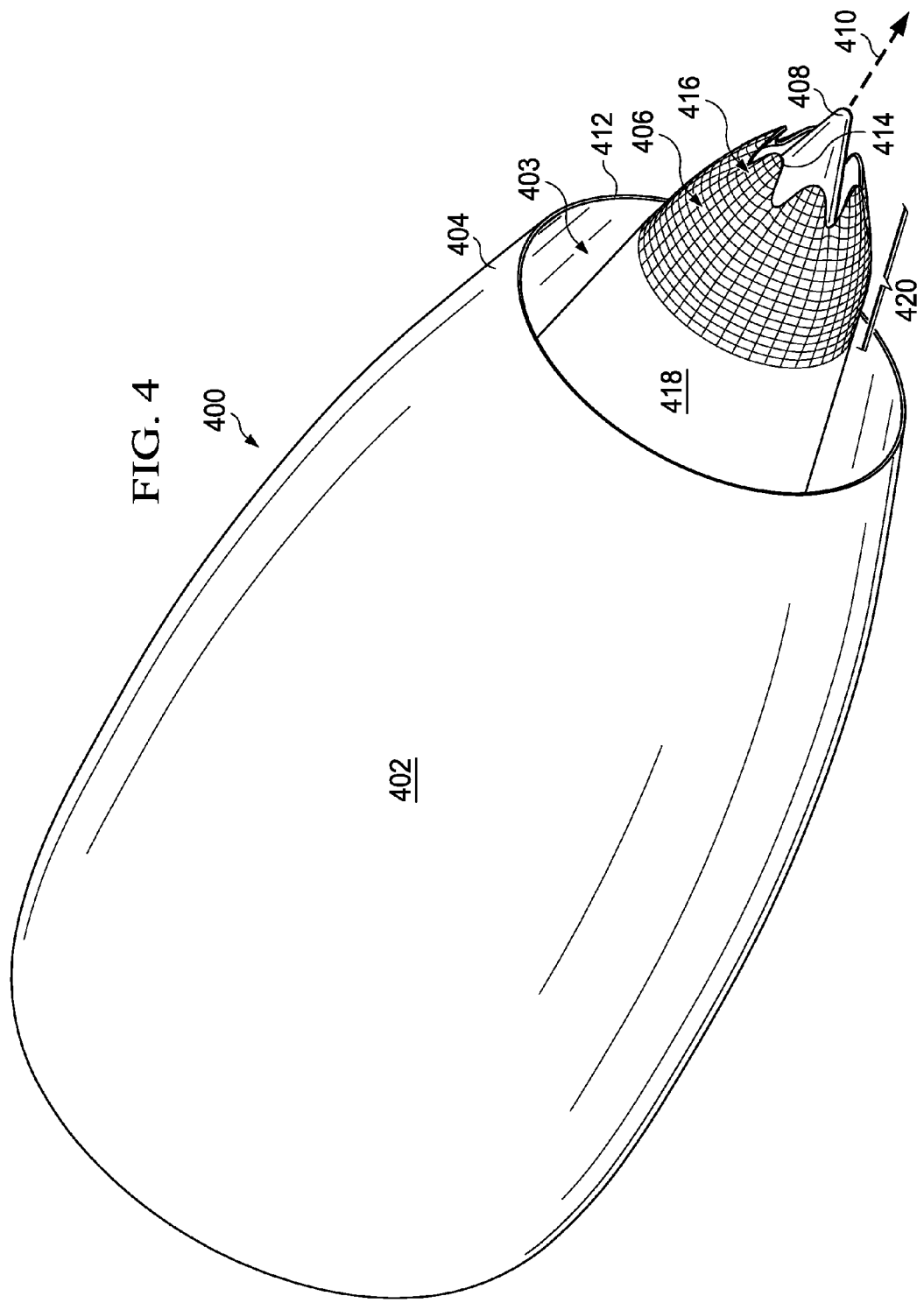
FIG. 4 is an illustration of a perspective view of an engine for an aircraft in accordance with an illustrative embodiment.

Turning now to FIG. 4, an illustration of a perspective view of an engine for an aircraft is depicted in accordance with an illustrative embodiment. In this illustrative example, engine 400 includes nacelle 402 and nozzle system 403. Nacelle 402 is a housing for engine 400. Nozzle system 403 is an example of one implementation for nozzle system 100 in FIG. 1. Nozzle system 403 is located at an aft end of nacelle 402.

Nozzle system 403 includes fan nozzle 404, core nozzle 406, and plug 408. Fan nozzle 404 is an example of one implementation for fan nozzle 112 in FIG. 1. Core nozzle 406 is an example of one implementation for core nozzle 114 in FIG. 1. Further, plug 408 is an example of one implementation for plug 115 in FIG. 1. As depicted, plug 408 has a conical shape in this example.

Fan nozzle 404 and core nozzle 406 allow exhaust generated during operation of engine 400 to exit engine 400 in the form an exhaust jet. In this illustrative example, core nozzle 406 is nested within fan nozzle 404. Plug 408 is nested within core nozzle 406.

As depicted, plug 408, core nozzle 406, and fan nozzle 404 share center axis 410. Of course, in other illustrative examples, the center axis for plug 408, core nozzle 406, and fan nozzle 404 may be substantially parallel but offset from each other.

Fan nozzle 404 has trailing edge 412. Further, core nozzle 406 has trailing edge 414 formed by plurality of extensions 416. Plurality of extensions 416 are an example of one implementation for plurality of extensions 143 in FIG. 1. Plurality of extensions 416 may also be referred to as a plurality of chevrons or a plurality of serrations in some cases.

Core nozzle 406 has outer surface 418. The shape of outer surface 418 of aft portion 420 of core nozzle 406 is configured such that outer surface 418 of aft portion 420 is curved. The shape of outer surface 418 is described in greater detail in the figures below.

Figure 5:
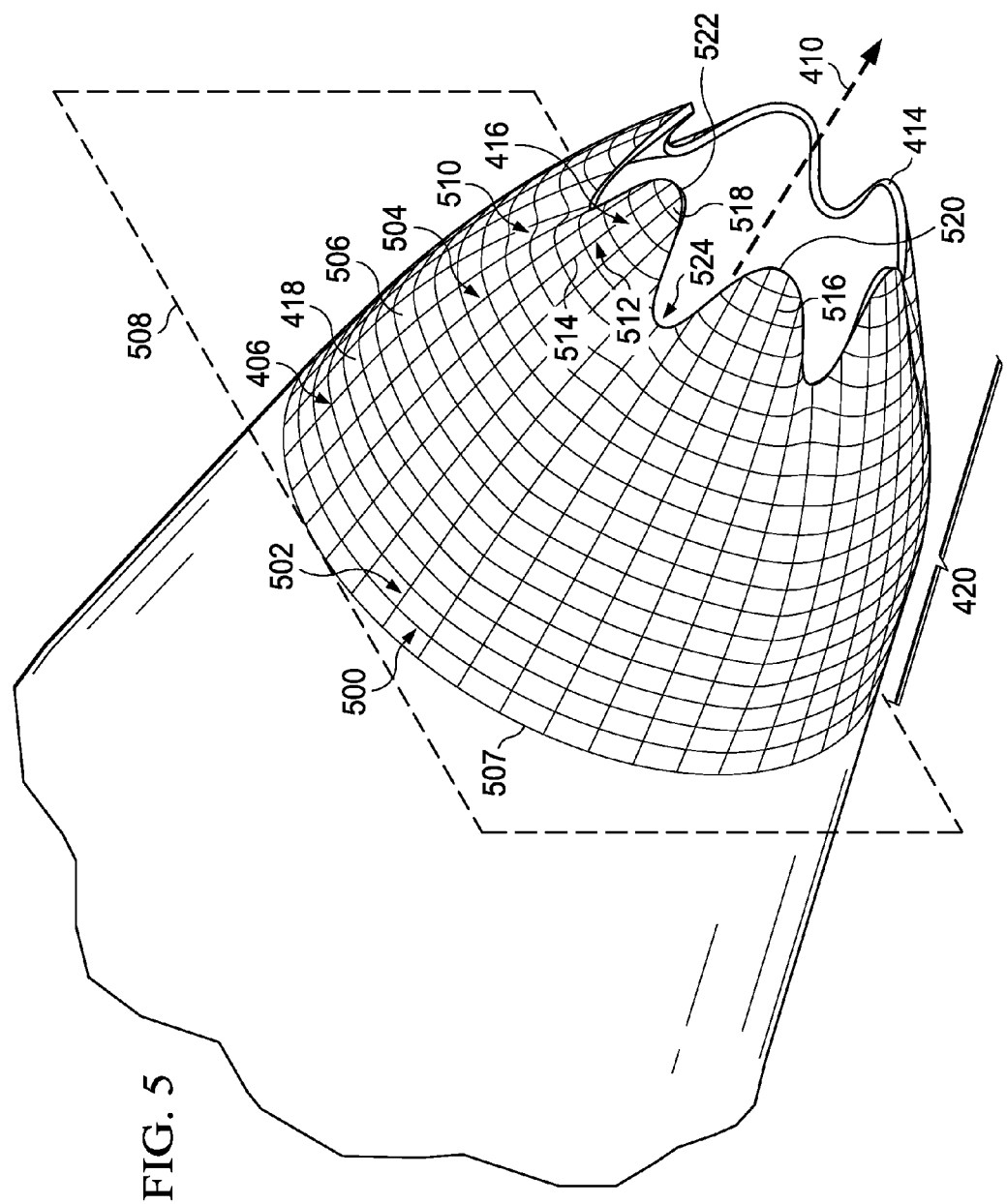
FIG. 5 is an illustration of a perspective view of a core nozzle of a nozzle system in accordance with an illustrative embodiment.

Turning now to FIG. 5, an illustration of a perspective view of core nozzle 406 of nozzle system 403 is depicted in accordance with an illustrative embodiment. An enlarged view of core nozzle 406 from FIG. 4 is depicted in FIG. 5. In this illustrative example, azimuthal lines 500 and longitudinal lines 502 on outer surface 418 of core nozzle 406 are contour lines that indicate the shape of outer surface 418 of aft portion 420 of core nozzle 406.

Azimuthal lines 500 lie along axial planes through core nozzle 406. Longitudinal lines 502 lie along radial planes through core nozzle 406. As depicted, outer surface 418 of aft portion 420 of core nozzle 406 is curved. For example, outer surface 418 has plurality of curves 504 that lie along a plurality of radial planes through center axis 410.

The shape of outer surface 418 formed by plurality of curves 504 is indicated by longitudinal lines 502 depicted on outer surface 418. For example, longitudinal line 506 indicates the shape of curve 510 of outer surface 418 beginning at selected axial plane 508 and ending at trailing edge 414. Selected axial plane 508 coincides with azimuthal line 507 in this example. In this illustrative example, all of the curves in plurality of curves 504 begin at selected axial plane 508 and end at trailing edge 414 of core nozzle 406.

The curvature along each curve in plurality of curves 504 changes along the direction of center axis 410. For example, the curvature along curve 510 may be greater closer to trailing edge 414 as compared to the curvature of curve 510 closer to selected axial plane 508. Further, as depicted, the curvature of curve 510 near trailing edge 414 may be greater than the curvature of curve 512 indicated by longitudinal line 514 near trailing edge 414.

In this illustrative example, plurality of extensions 416 includes extension 516 and extension 518. Extension 516 has tip 520 and extension 518 has tip 522. Root 524 is located at the interface between extension 516 and extension 518.

Figure 6:
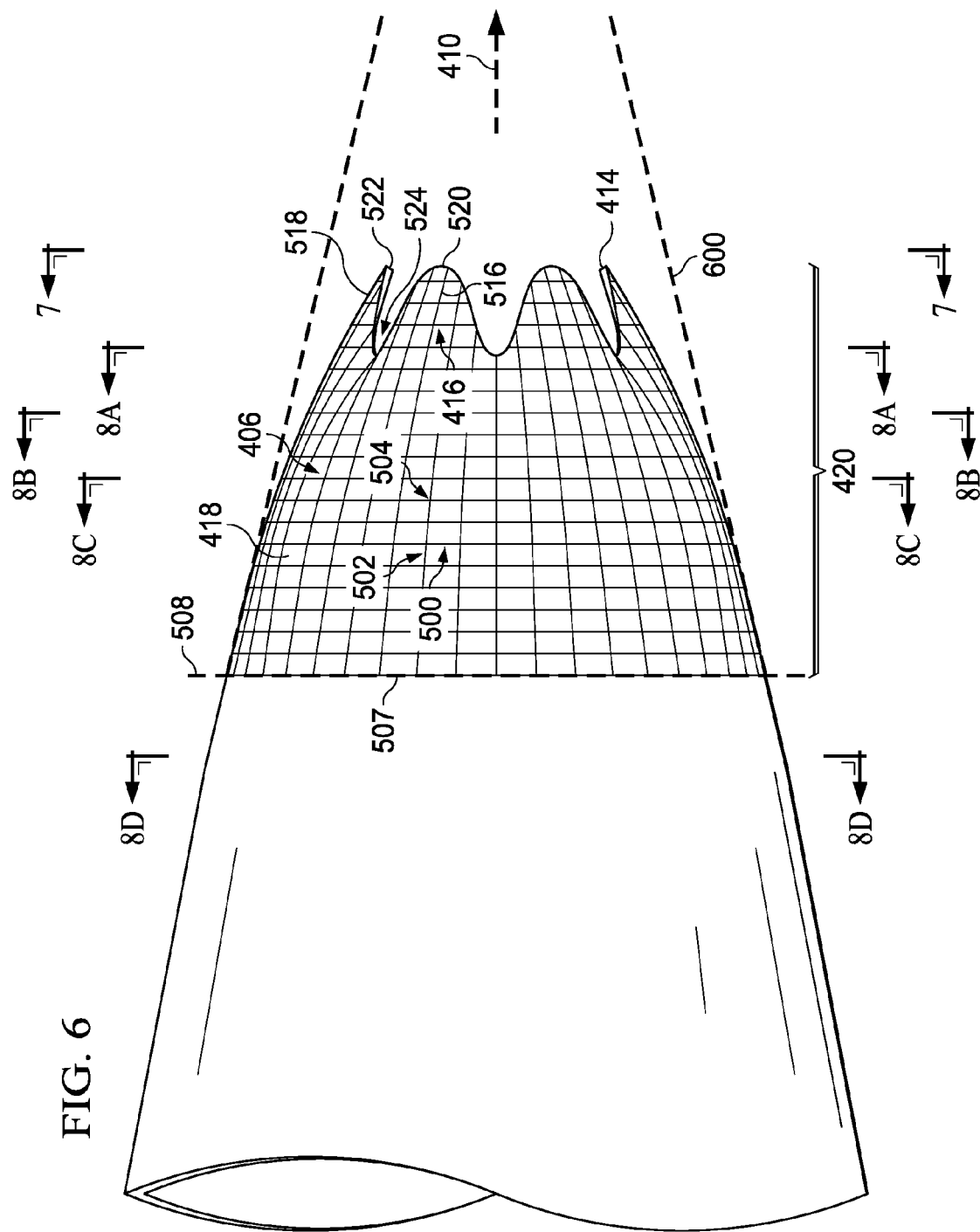
FIG. 6 is an illustration of a side view of a core nozzle of a nozzle system in accordance with an illustrative embodiment.

With reference now to FIG. 6, an illustration of a side view of core nozzle 406 of nozzle system 403 is depicted in accordance with an illustrative embodiment. As illustrated, all curves in plurality of curves 504 begin at selected axial plane 508.

Figure 7:
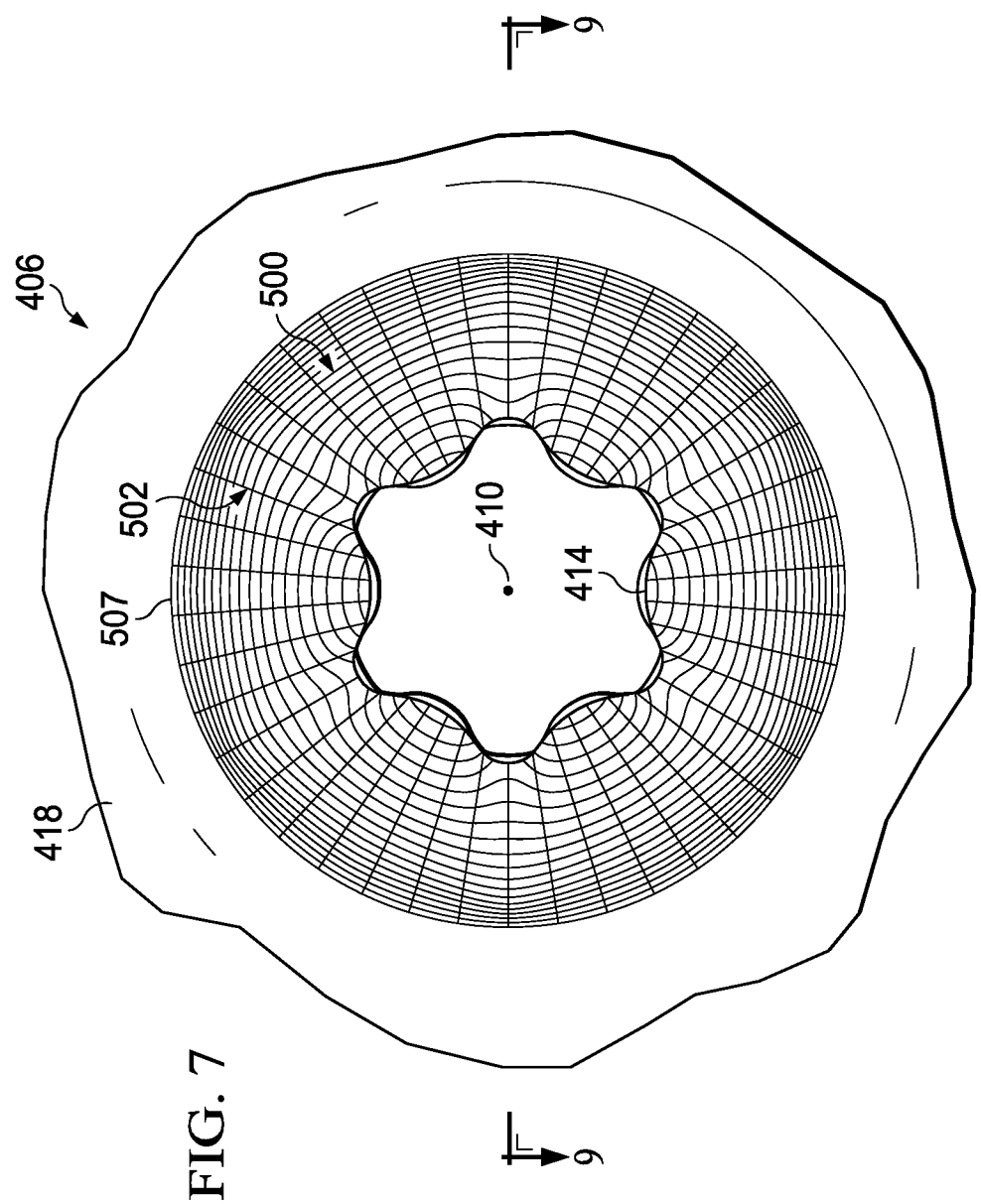
FIG. 7 is an illustration of an end view of a core nozzle in accordance with an illustrative embodiment.

Turning now to FIG. 7, an illustration of an end view of core nozzle 406 is depicted in accordance with an illustrative embodiment. In this illustrative example, an end view of core nozzle 406 taken with respect to lines 7-7 in FIG. 6 is depicted. As illustrated, outer surface 418 along any axial plane through aft portion 420 of core nozzle 406 has a wavy shape.

Figure 8:
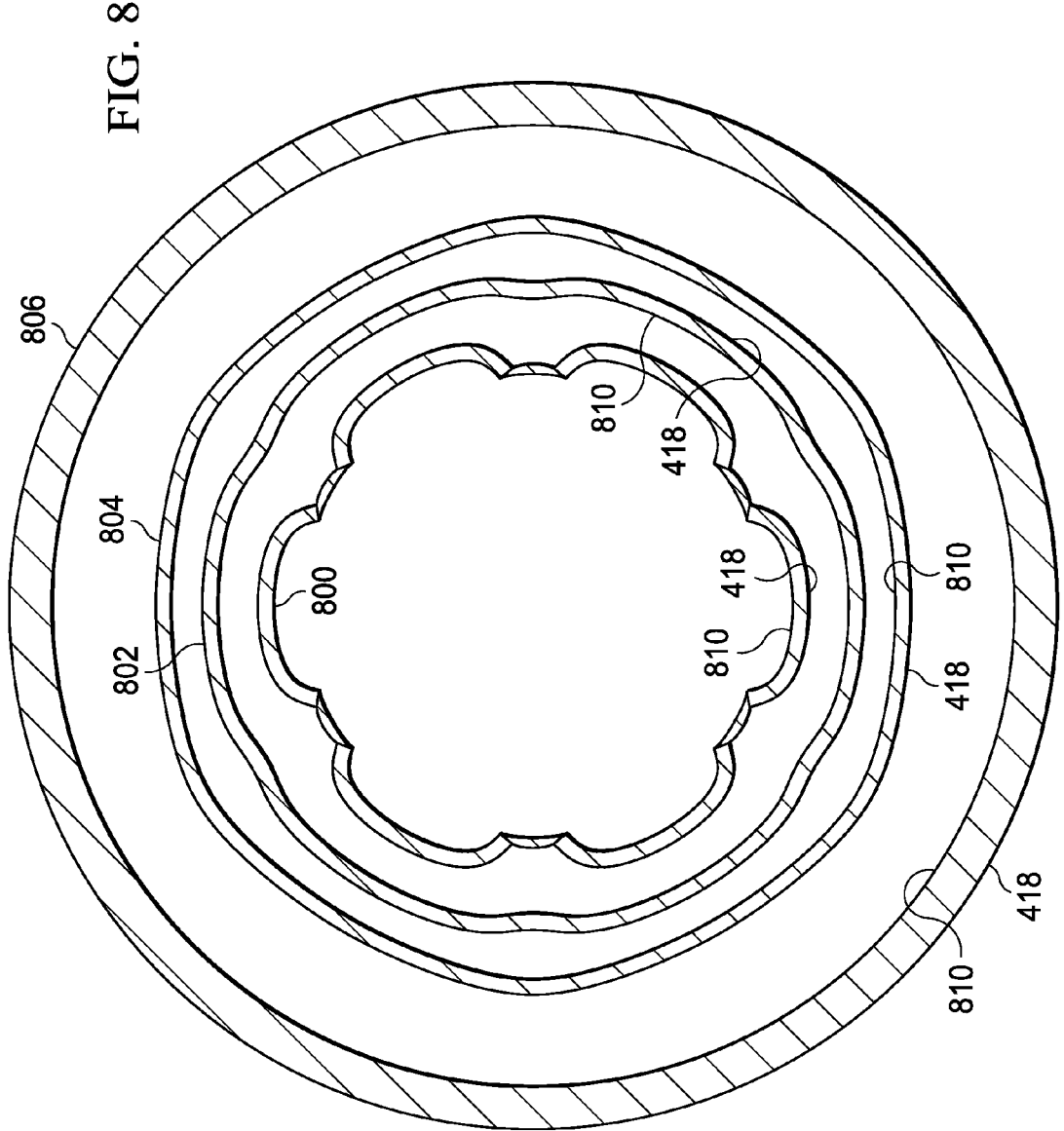
FIG. 8 is an illustration of axial cross-sections through a core nozzle in accordance with an illustrative embodiment.

With reference now to FIG. 8, an illustration of axial cross-sections through core nozzle 406 is depicted in accordance with an illustrative embodiment. In this illustrative example, axial cross-section 800 of core nozzle 406 is a cross-section along an axial plane through core nozzle 406 taken along lines 8A-8A in FIG. 6. Further, axial cross-section 802 is a cross-section along an axial plane through core nozzle 406 taken along lines 8B-8B in FIG. 6. Axial cross-section 804 is a cross-section along an axial plane through core nozzle 406 taken along lines 8C-8C in FIG. 6. Axial cross-section 806 is a cross-section along an axial plane through core nozzle 406 taken along lines 8D-8D in FIG. 6.

In this illustrative example, outer surface 418 of core nozzle 406 has a wavy shape in axial cross-section 800, axial cross-section 802, and axial cross-section 804. However, outer surface 418 of core nozzle 406 is substantially symmetrical and circular in axial cross-section 806.

In this illustrative example, inner surface 810 of core nozzle 406 is depicted in axial cross-section 800, axial cross-section 802, and axial cross-section 804. Although inner surface 810 of core nozzle 406 is depicted as having a shape similar to outer surface 418, inner surface 810 may have some other suitable shape in other illustrative examples. For example, in some cases, inner surface 810 may be substantially circular in each of axial cross-section 800, axial cross-section 802, axial cross-section 804, and axial cross-section 806.

Figure 9:
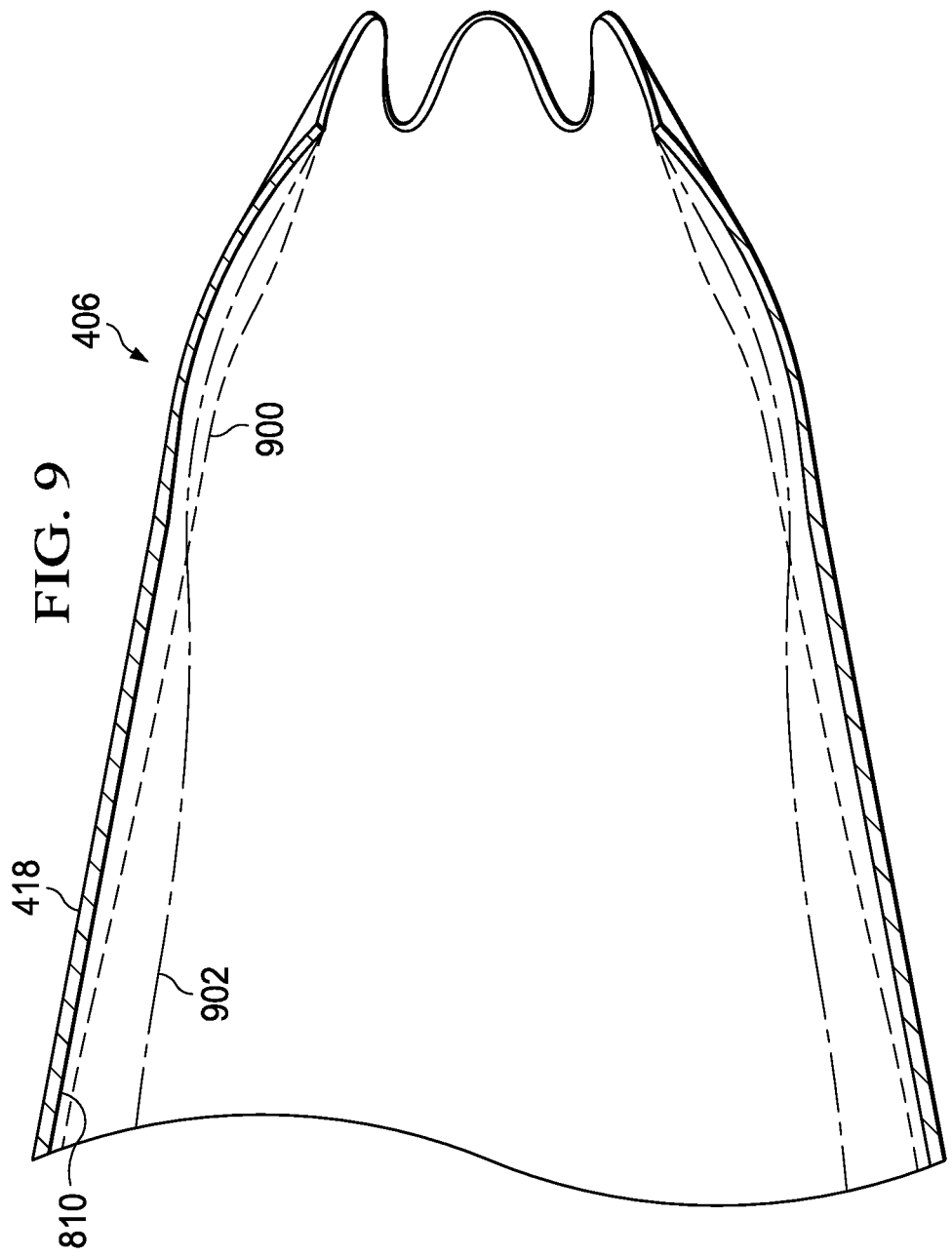
FIG. 9 is an illustration of a cross-sectional view of a core nozzle in accordance with an illustrative embodiment.

With reference now to FIG. 9, an illustration of a cross-sectional view of core nozzle 406 is depicted in accordance with an illustrative embodiment. In this illustrative example, a cross-sectional view of core nozzle 406 taken along lines 9-9 in FIG. 7 is depicted.

Inner surface 810 of core nozzle 406 is seen in this cross-sectional view. Although inner surface 810 of core nozzle 406 is depicted as curving in a manner similar to outer surface 418, inner surface 810 may curve in some other suitable manner, or in some cases, not curve.

For example, in some illustrative examples, core nozzle 406 may have alternate inner surface 900 instead of inner surface 810. In other illustrative examples, core nozzle 406 may have alternate inner surface 902 instead of inner surface 810.

Figure 10:
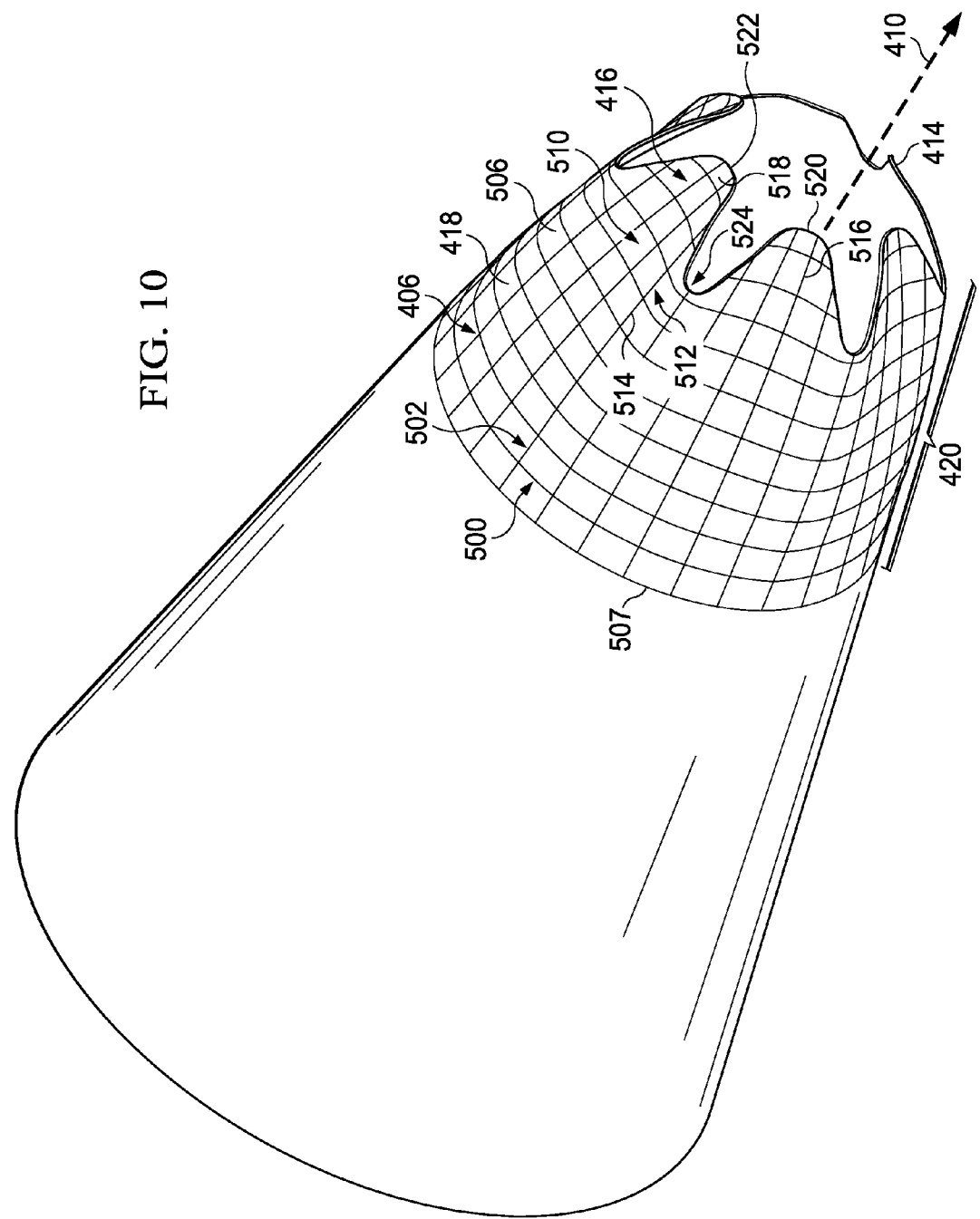
FIG. 10 is an illustration of another configuration for a core nozzle in accordance with an illustrative embodiment.

With reference now to FIG. 10, an illustration of another configuration for core nozzle 406 is depicted in accordance with an illustrative embodiment. In this illustrative example, outer surface 418 of aft portion 420 of core nozzle 406 in FIG. 10 has a different shape than outer surface 418 of aft portion 420 of core nozzle 406 in FIGS. 4-9. In particular, outer surface 418 of aft portion 420 of core nozzle 406 in FIG. 10 is curved in a manner that is different from the curving of outer surface 418 of aft portion 420 of core nozzle 406 in FIGS. 4-9. For example, plurality of curves 504 along the different radial planes through core nozzle 406 in FIG. 10 have different curvatures than plurality of curves 504 in FIG. 5.

Figure 11:
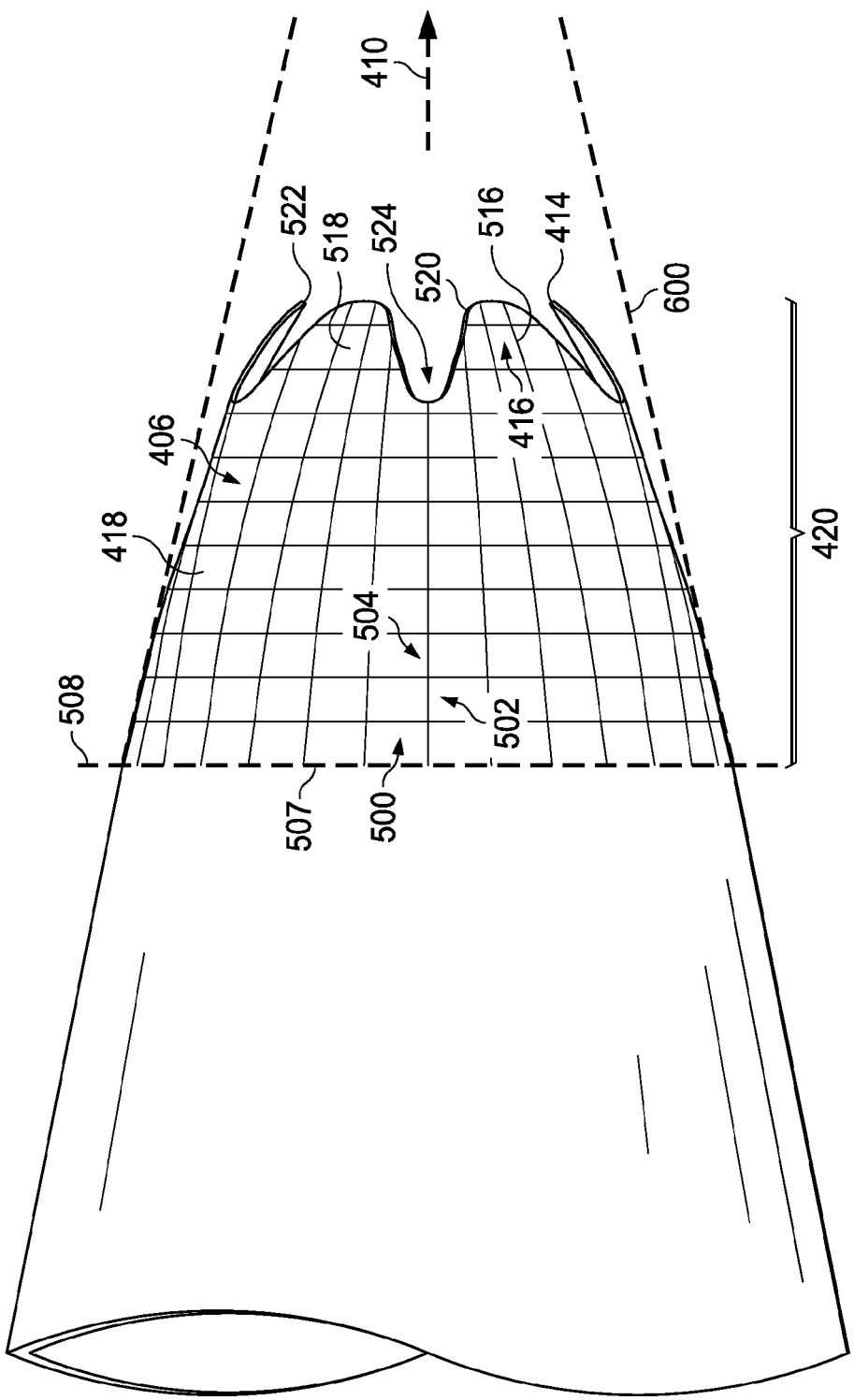
FIG. 11 is an illustration of a side view of a core nozzle in accordance with an illustrative embodiment.

Turning now to FIG. 11, an illustration of a side view of core nozzle 406 is depicted in accordance with an illustrative embodiment. In this illustrative example, a side view of core nozzle 406 from FIG. 10 is depicted.

Figure 12:
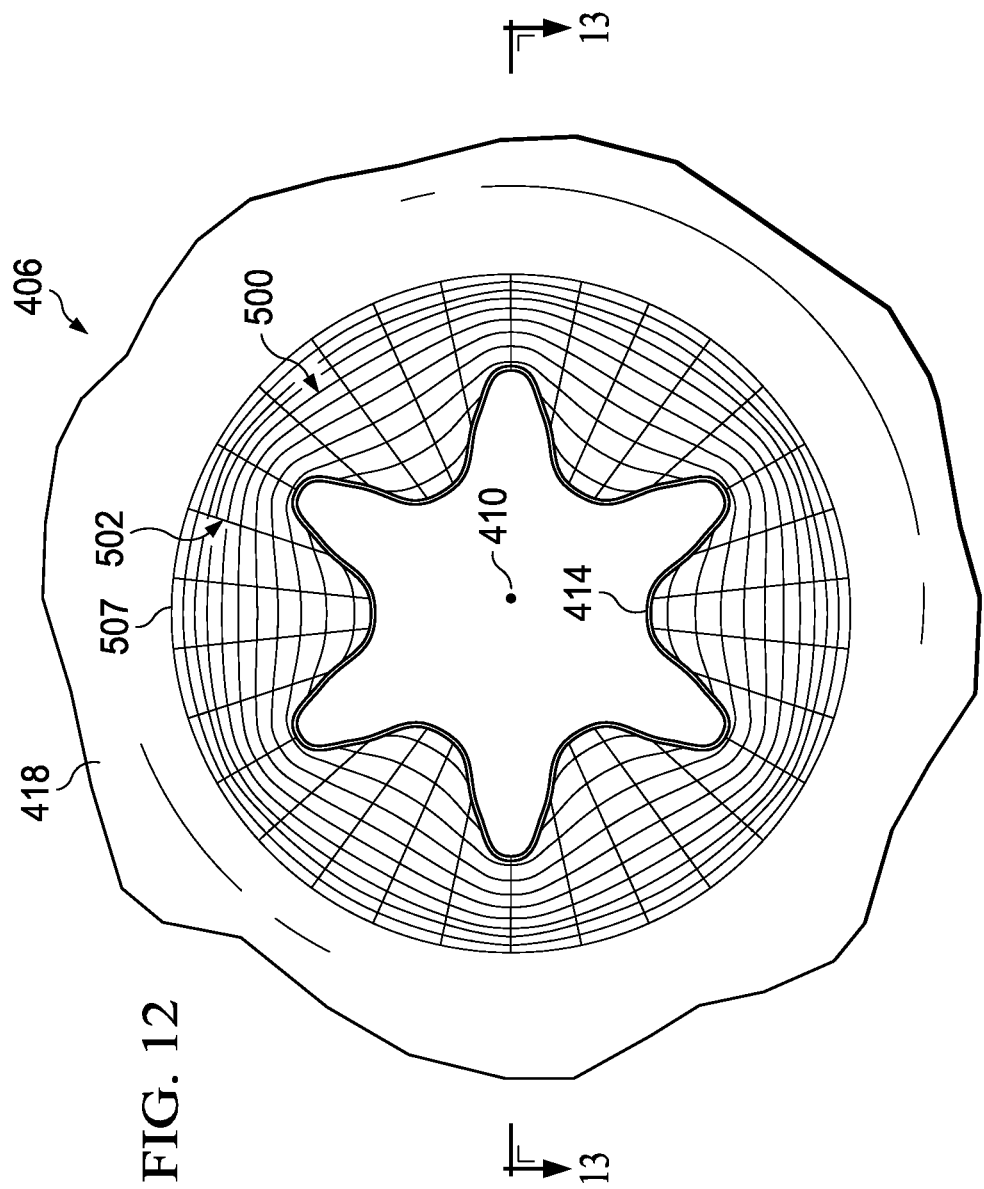
FIG. 12 is an illustration of an end view of a core nozzle in accordance with an illustrative embodiment.

Referring now to FIG. 12, an illustration of an end view of core nozzle 406 is depicted in accordance with an illustrative embodiment. In particular, an end view of core nozzle 406 from FIG. 10 taken along lines 12-12 is depicted.

Figure 13:
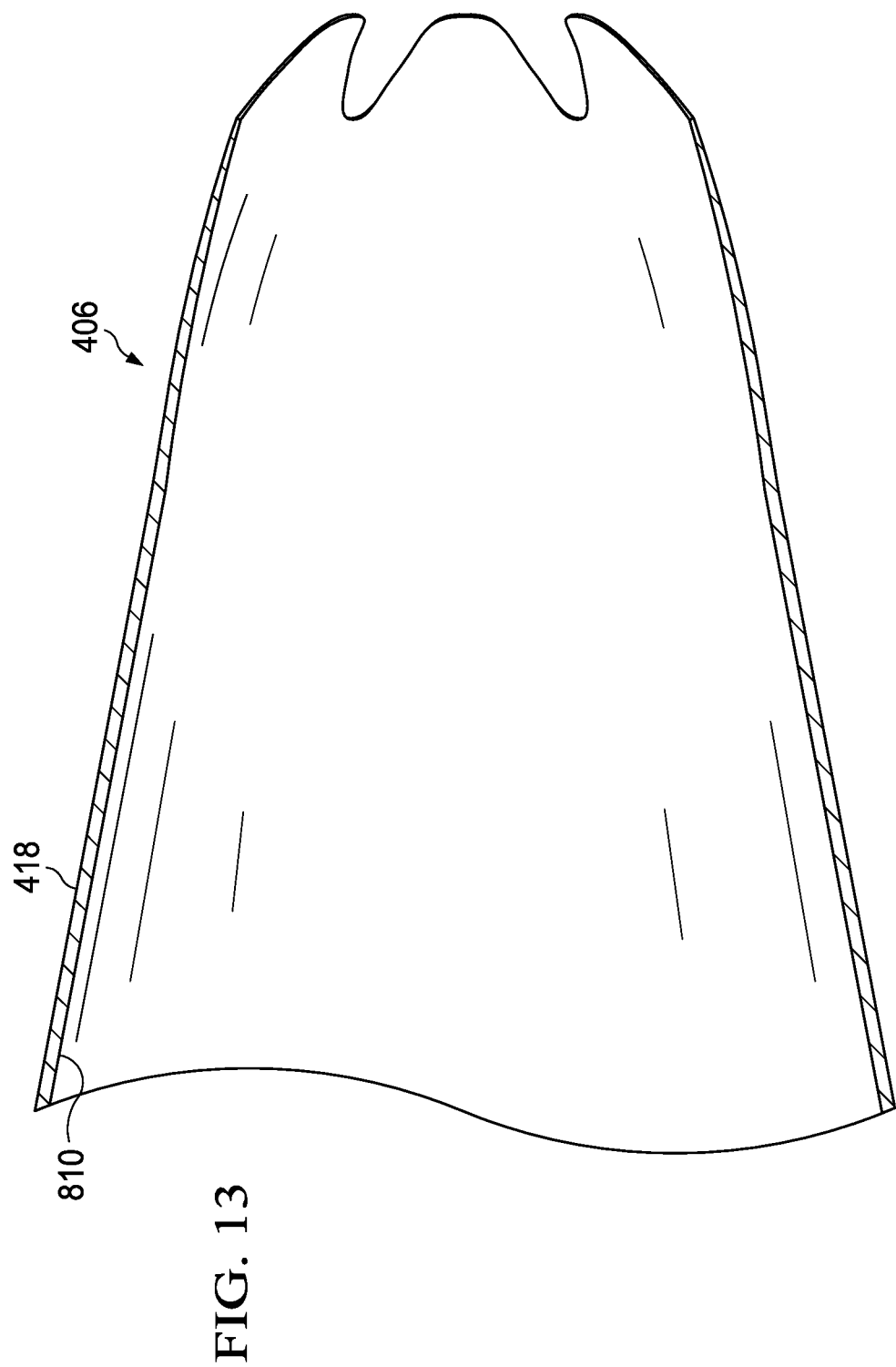
FIG. 13 is an illustration of a cross-sectional view of a core nozzle in accordance with an illustrative embodiment.

With reference now to FIG. 13, an illustration of a cross-sectional view of core nozzle 406 is depicted in accordance with an illustrative embodiment. In this illustrative example, a cross-sectional view of core nozzle 406 from FIG. 10 is depicted taken along lines 13-13 in FIG. 12.

Figure 14:
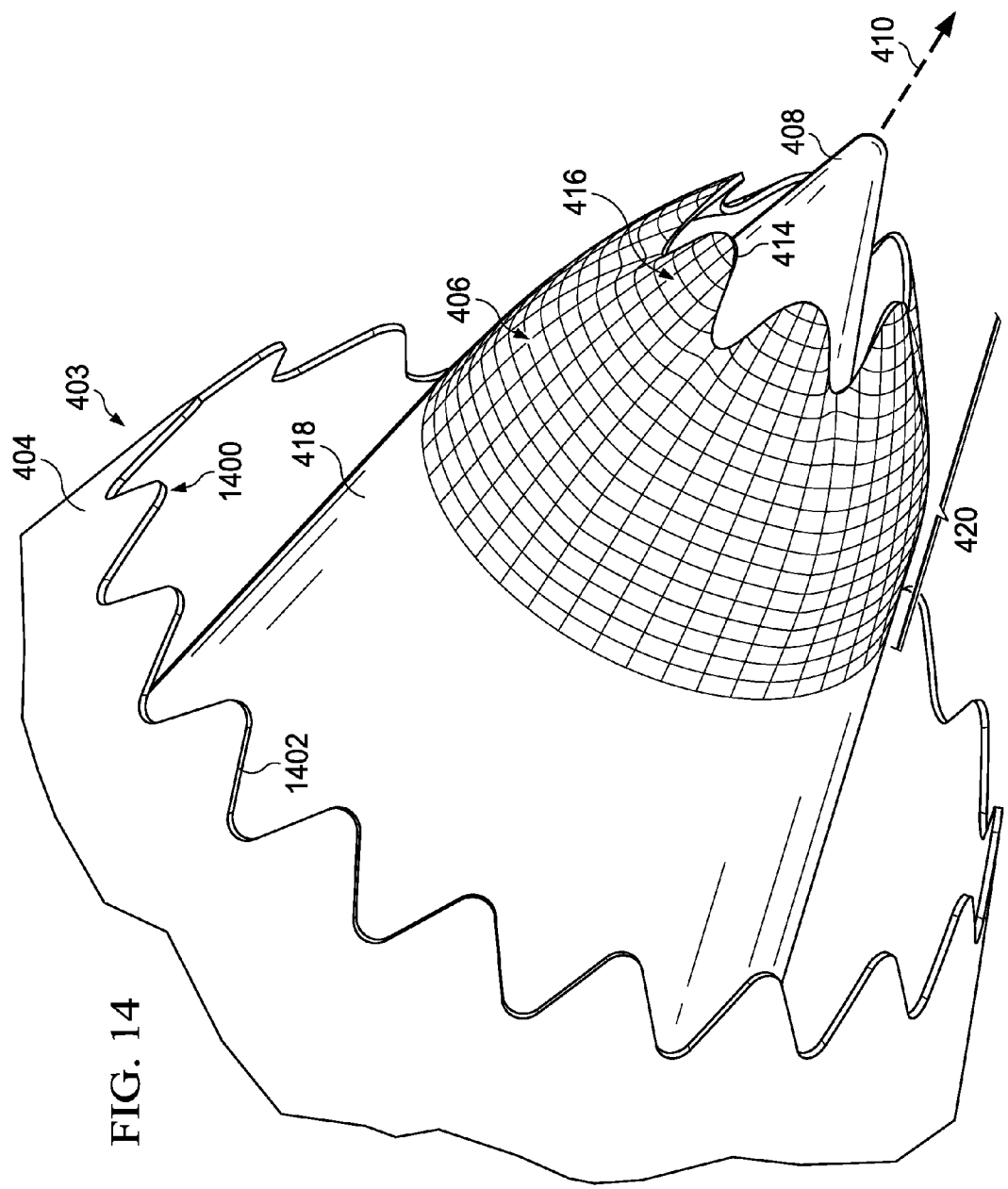
FIG. 14 is an illustration of a portion of a nozzle system in accordance with an illustrative embodiment.

With reference now to FIG. 14, an illustration of a portion of nozzle system 403 is depicted in accordance with an illustrative embodiment. In this illustrative example, fan nozzle 404 of nozzle system 403 is depicted having plurality of extensions 1400. With plurality of extensions 1400, fan nozzle 404 has trailing edge 1402 instead of trailing edge 412 in FIG. 4. Plurality of extensions 1400 may be configured to help reduce noise generated by engine 400.

Figure 15:
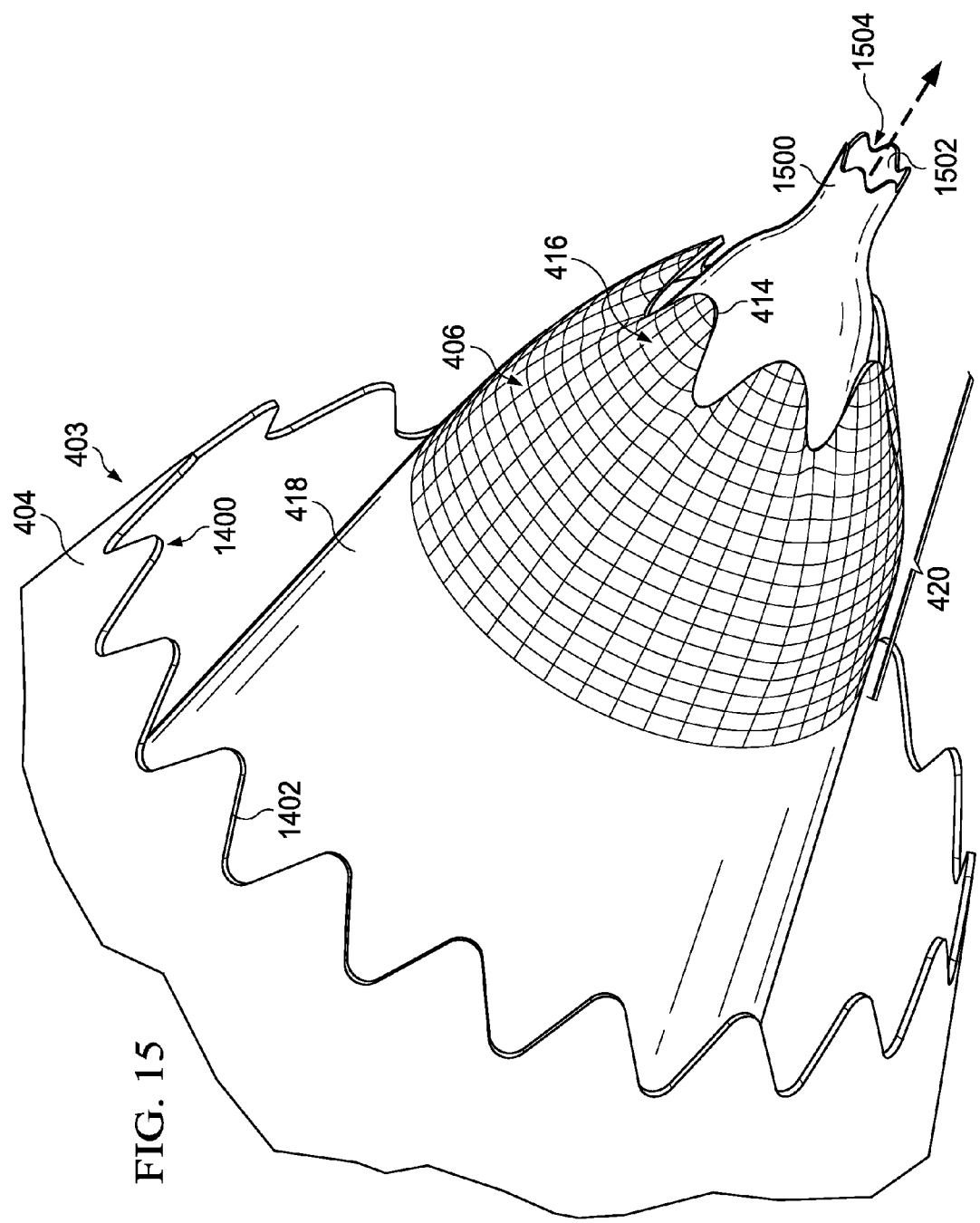
FIG. 15 is an illustration of a portion of a nozzle system with a plug having a channel in accordance with an illustrative embodiment.

Turning now to FIG. 15, an illustration of a portion of nozzle system 403 with a plug having a channel is depicted in accordance with an illustrative embodiment. In this illustrative example, nozzle system 403 uses fan nozzle 404 having plurality of extensions from FIG. 14. Further, nozzle system 403 uses plug 1500 instead of plug 408 from FIG. 4. As depicted, plug 1500 has channel 1502 configured to vent gases. Further, plug 1500 has plurality of extensions 1504.

Figure 16:
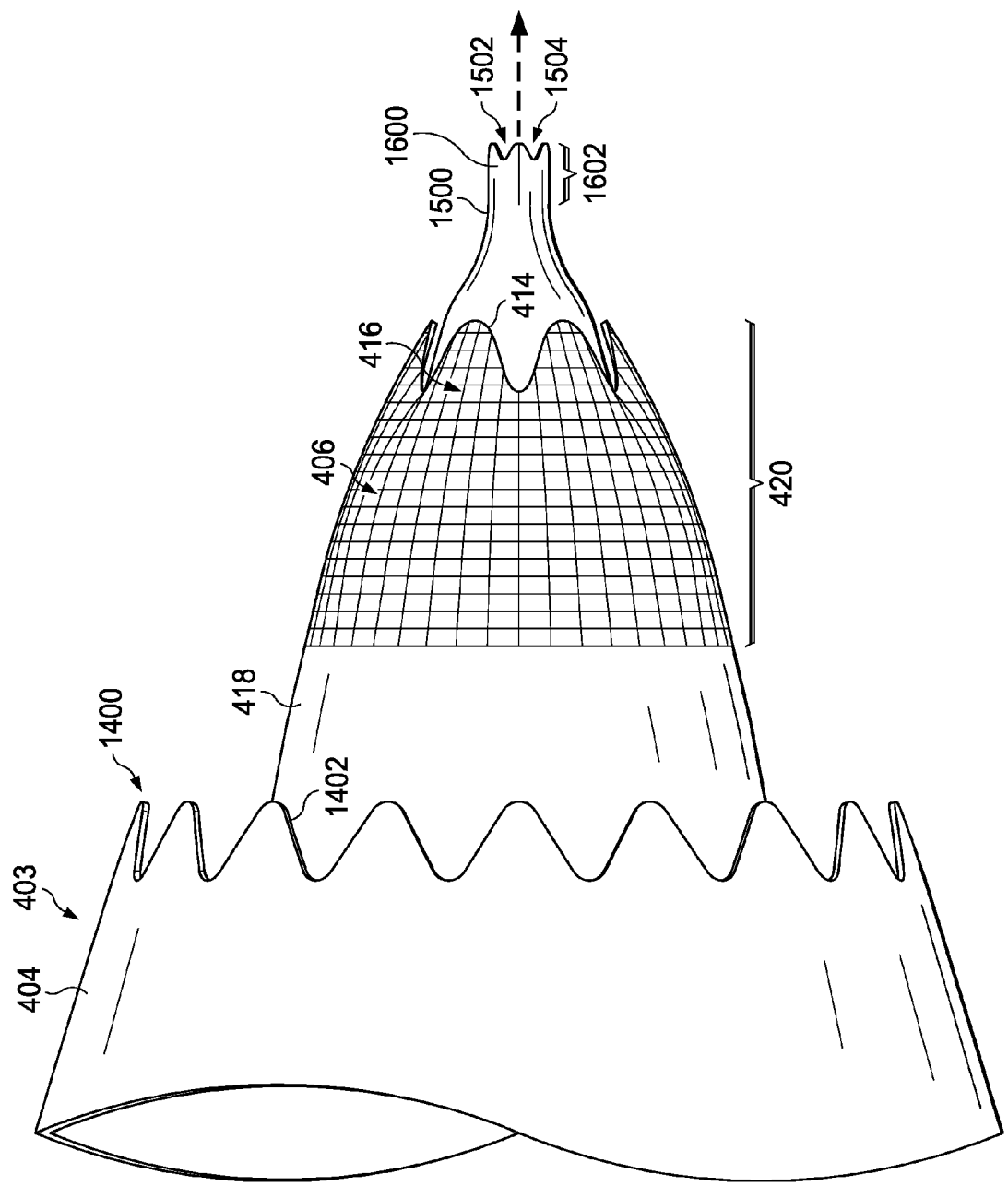
FIG. 16 is an illustration of a side view of a portion of a nozzle system with a plug having a channel in accordance with an illustrative embodiment.

With reference now to FIG. 16, an illustration of a side view of a portion of nozzle system 403 with plug 1500 having channel 1502 is depicted in accordance with an illustrative embodiment. As depicted, outer surface 1600 of aft portion 1602 of plug 1500 is not curved.

Figure 17:
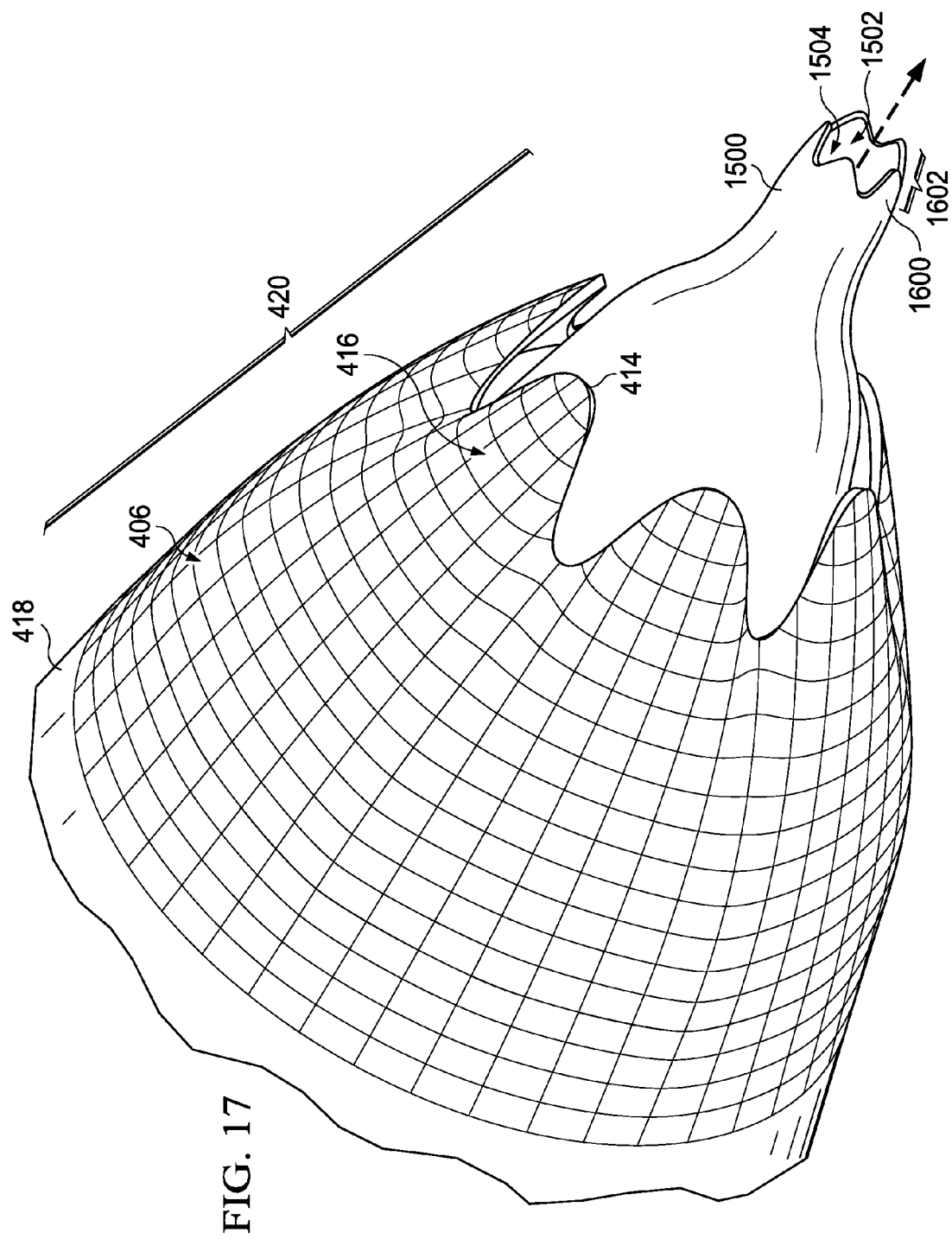
FIG. 17 is an illustration of a portion of a nozzle system with a plug having a channel in accordance with an illustrative embodiment.

With reference now to FIG. 17, an illustration of a portion of nozzle system 403 with plug 1500 having channel 1502 is depicted in accordance with an illustrative example. In this illustrative example, outer surface 1600 of aft portion 1602 of plug 1500 is curved along a plurality of longitudinal lines through center axis 410. The shape of aft portion 1602 of plug 1500 may be a shape similar to the shape of core nozzle 406 in FIGS. 4 and 5. This configuration for plug 1500 may help reduce shock-cell noise when the jet stream between core nozzle 406 and plug 1500 is supersonic.

Figure 18:
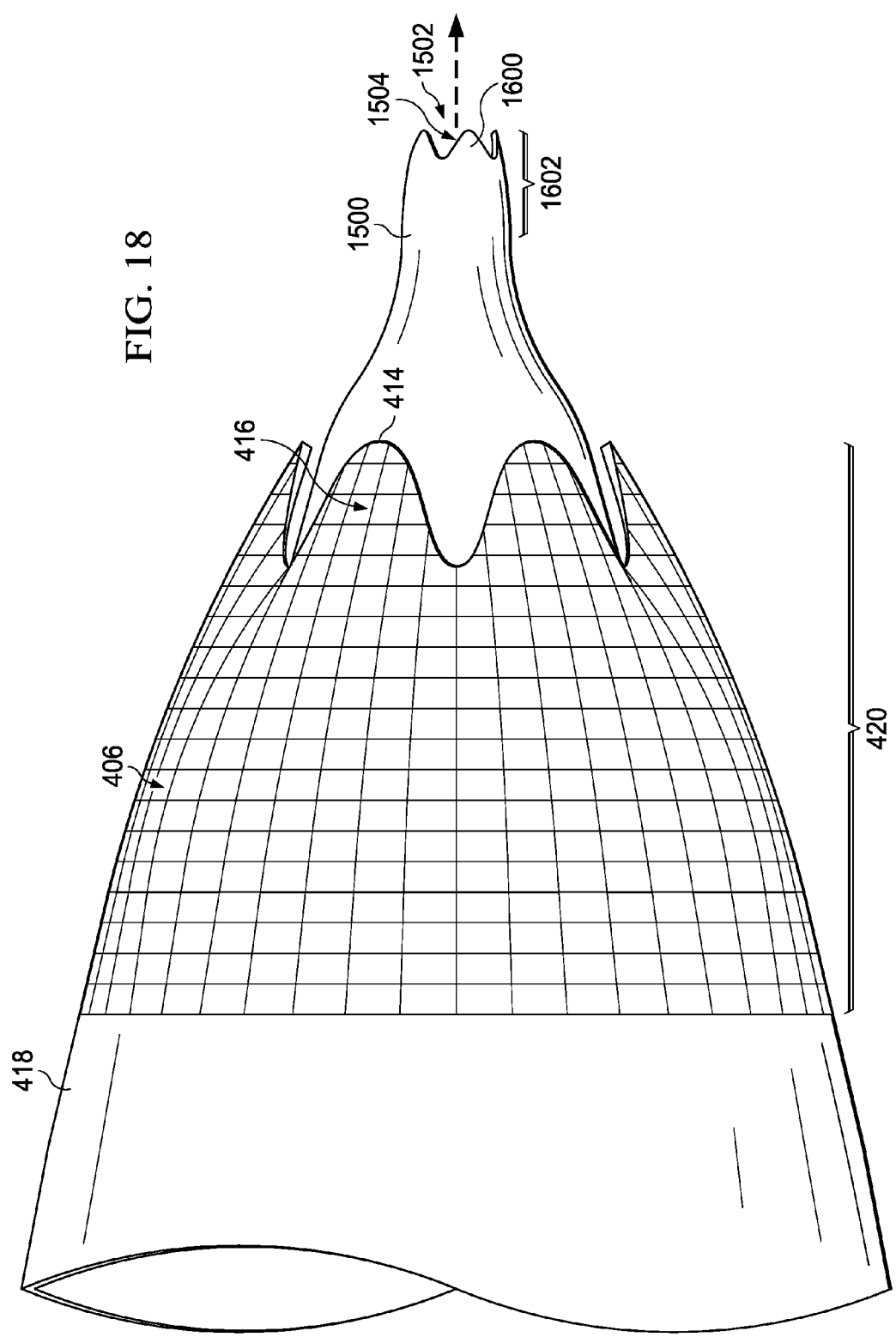
FIG. 18 is an illustration of a side view of a nozzle system with a plug having a channel in accordance with an illustrative embodiment.

Turning now to FIG. 18, an illustration of a side view of nozzle system 403 with plug 1500 having channel 1502 is depicted in accordance with an illustrative example. As depicted, nozzle system 403 in FIG. 17, with plug 1500 having channel 1502 and with outer surface 1600 of aft portion 1602 curved, is depicted.

Figure 19:
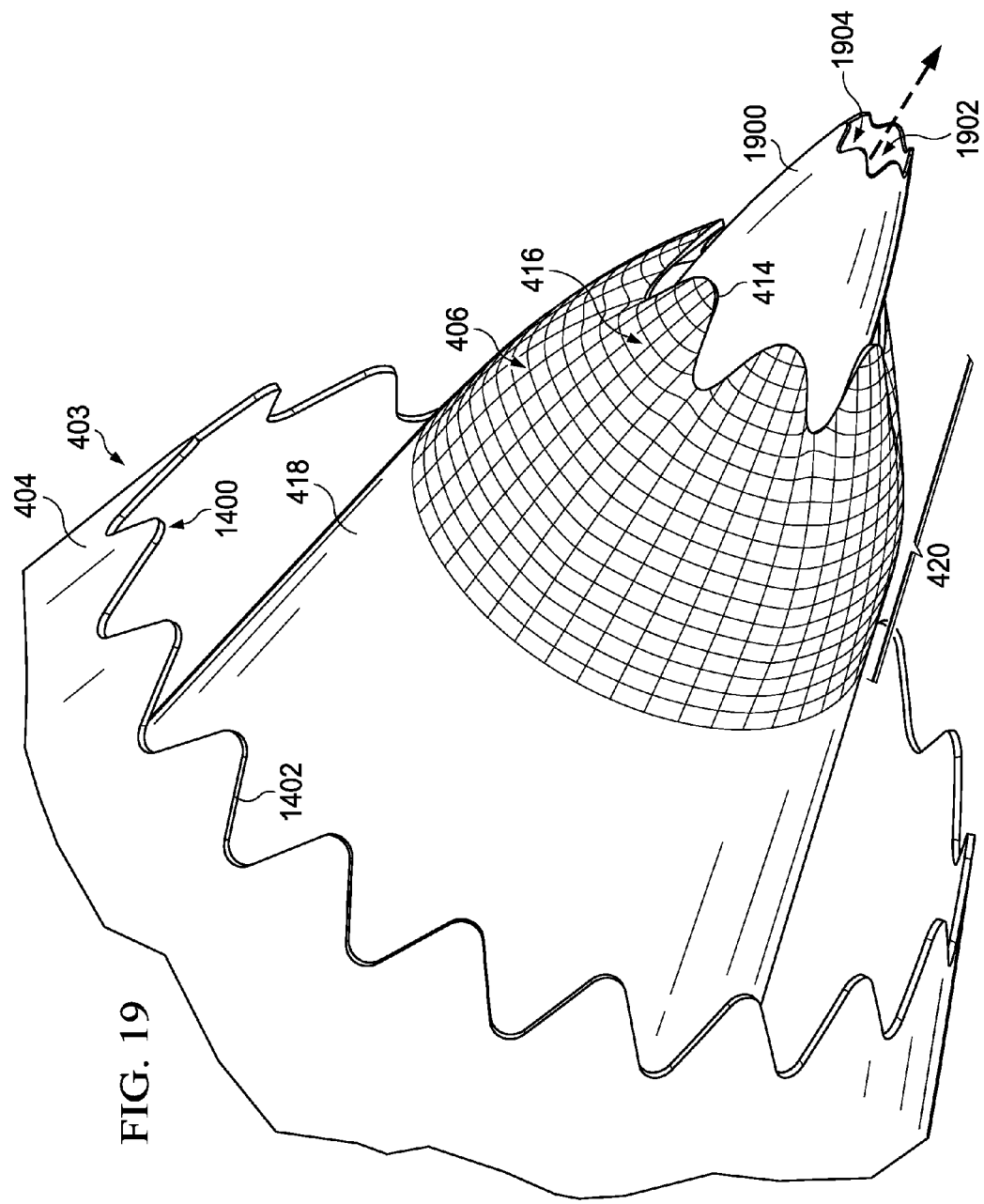
FIG. 19 is an illustration of a portion of a nozzle system with a different type of plug in accordance with an illustrative embodiment.

With reference now to FIG. 19, an illustration of a portion of nozzle system 403 with a plug having a different shape is depicted in accordance with an illustrative embodiment. In this illustrative example, nozzle system 403 uses plug 1900 instead of plug 1500 in FIGS. 15-18 or plug 408 in FIG. 4. Plug 1900 has channel 1902 and plurality of extensions 1904.

The illustrations of the different configurations for fan nozzle 404, core nozzle 406, and plug 408 of nozzle system 403 in FIGS. 4-18 and plug 1900 in FIG. 19 are not meant to imply physical or architectural limitations to the manner in which an illustrative embodiment may be implemented. Other components in addition to or in place of the ones illustrated may be used. Some components may be unnecessary.

For example, although core nozzle 406 has been depicted as extending aftwards past trailing edge 412 of fan nozzle 404, fan nozzle 404 may extend aftwards past trailing edge 414 of core nozzle 406 in some illustrative examples. Of course, in other illustrative examples, a plug may be optional for nozzle system 403.

Further, the different components shown in FIGS. 4-19 may be combined with components in FIG. 1, used with components in FIG. 1, or a combination of the two. Additionally, some of the components in these figures may be illustrative examples of how components shown in block form in FIG. 1 can be implemented as physical structures.

Figure 20:
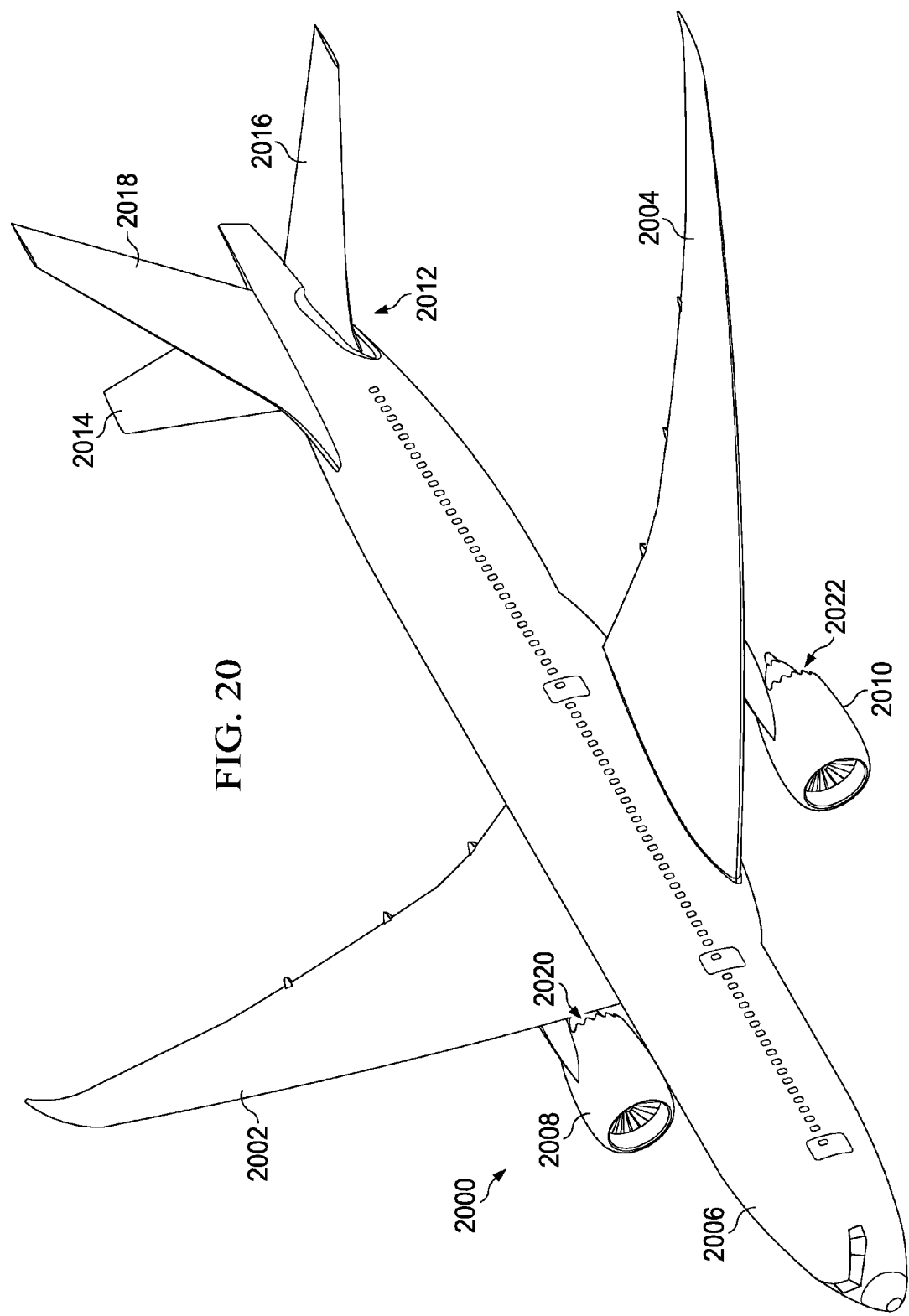
FIG. 20 is an illustration of an aircraft in accordance with an illustrative embodiment.

With reference now to FIG. 20, an illustration of an aircraft is depicted in accordance with an illustrative embodiment. In this illustrative example, aircraft 2000 is an example of one implementation for aerospace vehicle 105 in FIG. 1. Aircraft 2000 has wing 2002 and wing 2004 attached to body 2006.

Aircraft 2000 includes engine 2008 attached to wing 2002 and engine 2010 attached to wing 2004. Engine 2008 and engine 2010 may be examples of one implementation for engine 102 in FIG. 1. Body 2006 of aircraft 2000 has tail section 2012. Horizontal stabilizer 2014, horizontal stabilizer 2016, and vertical stabilizer 2018 are attached to tail section 2012 of body 2006.

In this illustrative example, engine 2008 has nozzle system 2020, and engine 2010 has nozzle system 2022. Nozzle system 2020 and nozzle system 2022 may have the same configuration as nozzle system 403 in FIG. 14 with fan nozzle 404 having plurality of extensions 1400, core nozzle 406 having outer surface 418 of aft portion 420 of core nozzle 406 curved, and plug 408.

Figure 21:
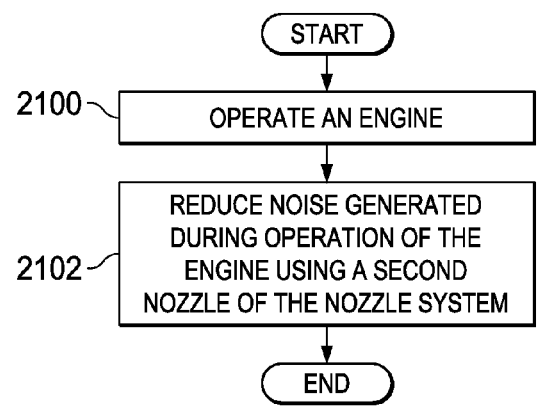
FIG. 21 is an illustration of a process for reducing noise generated by an engine in the form of a flowchart in accordance with an illustrative embodiment.

With reference now to FIG. 21, an illustration of a process for reducing noise generated by an engine in the form of a flowchart is depicted in accordance with an illustrative embodiment. The process illustrated in FIG. 21 may be implemented using nozzle system 100 for engine 102 in FIG. 1 and/or the different configurations for nozzle system 403 described in FIGS. 4-19.

The process begins by operating an engine (operation 2100). The engine comprises a first nozzle and a second nozzle. The second nozzle is at least partially surrounded by the first nozzle. An outer surface of an aft portion of the second nozzle has a shape configured such that a radial cross-section of the outer surface of the aft portion of the second nozzle has a curve that is different from at least one other curve for another radial cross-section of the outer surface of the aft portion of the second nozzle.

In operation 2100, the engine may generate exhaust that exits the nozzle system as an exhaust jet. The exhaust jet comprises a first jet stream that exits the first nozzle and a second jet stream that exits the second nozzle. The first jet stream may exit the first nozzle at a first supersonic speed and the second jet stream may exit the second nozzle at one of a second supersonic speed or a subsonic speed.

The process then reduces noise generated during operation of the engine using the second nozzle of the nozzle system (operation 2101), with the process terminating thereafter. In operation 2102, the shape of the outer surface of the aft portion of the second nozzle is selected to reduce shock-cell noise associated with a shock-cell pattern that forms in the first jet stream when the first jet stream exits the nozzle system at supersonic speeds.

The flowcharts and the block diagram in the different depicted embodiments illustrate the architecture, functionality, and operation of some possible implementations of apparatuses and methods in an illustrative embodiment. In this regard, each block in the flowcharts or block diagram may represent a module, segment, function, and/or a portion of an operation or step. For example, one or more of the blocks may be implemented as program code, in hardware, or a combination of the program code and hardware.

In some alternative implementations of an illustrative embodiment, the function or functions noted in the blocks may occur out of the order noted in the figures. For example, in some cases, two blocks shown in succession may be executed substantially concurrently or the blocks may sometimes be performed in the reverse order, depending upon the functionality involved. Also, other blocks may be added in addition to the illustrated blocks in the flowcharts or block diagram.

Thus, the different illustrative embodiments provide a method and apparatus for reducing noise generated during operation of an engine. In one illustrative embodiment, an apparatus comprises a first nozzle and a second nozzle at least partially surrounded by the first nozzle. An outer surface of an aft portion of the second nozzle has a shape configured such that a radial cross-section of the outer surface of the aft portion of the second nozzle has a curve that is different from at least one other curve for another radial cross-section of the outer surface of the aft portion of the second nozzle.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A nozzle system that comprises:
    a first nozzle that comprises a first aft portion that comprises a first outer surface that comprises a first shape, wherein the first shape and a second shape of a second outer surface of a second aft portion of a second nozzle each comprises a wavy shape, such that in operation, in response to formation of a first shock-cell pattern in a first jet stream that exits the first nozzle during operation of the nozzle system during a cruise phase of a flight, the first shape and the second shape reduce a first noise associated with the first shock-cell pattern;
    the second nozzle is at least partially surrounded by the first nozzle, and configured such that:
        a first radial cross-section of the second outer surface comprises a first curve that varies from at least a second curve for a second radial cross-section of the second outer surface; and
        an axial cross-section of the second outer surface comprises a wavy shape; and
    a plug that comprises a plug aft portion that comprises a plug outer surface that comprises a third shape comprising a wavy shape located downstream of the wavy shape of the second nozzle such that in operation, in response to formation of a second shock-cell pattern in a second jet stream that exits the second nozzle during operation of the nozzle system during the cruise phase of the flight, the second shape and the third shape reduce a second noise associated with the second shock-cell pattern, wherein the plug comprises an interior passage that outlets a third jet stream.

2. The nozzle system of claim 1, wherein each curve for each radial cross-section of the second outer surface begins at a selected axial plane through the second nozzle and ends at a trailing edge of the second nozzle.

3. The nozzle system of claim 1, wherein the first curve for the first radial cross-section of the second outer surface comprises a number of portions with a number of curvatures.

4. The nozzle system of claim 1, wherein the second nozzle further comprises an inner surface such that a shape of the inner surface along a particular radial cross-section of the second aft portion of the second nozzle differs from a particular curve of the second outer surface of the particular radial cross-section.

5. The nozzle system of claim 1, wherein the second nozzle comprises:
    a plurality of extensions extending aftwards from an exit boundary along the second outer surface.

6. The nozzle system of claim 5, wherein an extension in the plurality of extensions is selected from one of a chevron and a serration.

7. The nozzle system of claim 5, wherein an extension in the plurality of extensions comprises a base that lies along the exit boundary and a tip located downstream of the exit boundary.

8. The nozzle system of claim 1, wherein the axial cross-section of the second outer surface comprises at least one of hills and valleys with respect to a center axis through the second nozzle.

9. The nozzle system of claim 1, further comprising the axial cross-section of the second outer surface being non-axisymmetrical.

10. The nozzle system of claim 1, wherein the first curve for the first radial cross-section of the second outer surface comprises a curvature that continuously changes between a selected axial plane through the second nozzle and a trailing edge of the second nozzle.

11. The nozzle system of claim 1, wherein the first nozzle comprises:
    a plurality of extensions.

12. The nozzle system of claim 1 further comprising:
    the plug being at least partially surrounded by the second nozzle.

13. The nozzle system of claim 12, wherein the plug comprises: a plurality of extensions at an aft end of the plug.

14. The nozzle system of claim 1, wherein the nozzle system is part of an engine for an aerospace vehicle.

15. The nozzle system of claim 14, wherein the engine is a turbofan engine.

16. The nozzle system of claim 1, wherein the first nozzle is a fan nozzle and the second nozzle is a core nozzle.

17. An engine comprising:
a housing; and
a nozzle system at an aft end of the housing for the engine, wherein the nozzle system comprises:
a fan nozzle that comprises a fan aft portion that comprises a fan outer surface that comprises a first shape, wherein the first shape and a second shape of a core outer surface of a core aft portion of a core nozzle each comprises a wavy shape, such that in operation, in response to formation of a first shock-cell pattern in a first jet stream that exits the fan nozzle during operation of the engine during a cruise phase of a flight, the first shape and the second shape reduce a first noise associated with the first shock-cell pattern;
the core nozzle is at least partially surrounded by the fan nozzle, and configured such that a first radial cross-section of the core outer surface comprises a first curve comprising a curvature different from at least one other curve for a second radial cross-section of the core outer surface;
an axial cross-section of the core outer surface comprises a wavy shape; and
a plug that comprises a plug aft portion that comprises a plug outer surface that comprises a third shape comprising a wavy shape located downstream of the wavy shape of the core nozzle such that in operation, in response to formation of a second shock-cell pattern in a second jet stream that exits the core nozzle during operation of the engine during the cruise phase of the flight, the second shape and the third shape reduce a second noise associated with the second shock-cell pattern, wherein the plug comprises an interior passage that outlets a third jet stream.

18. The engine of claim 17, wherein the first curve for the first radial cross-section of the core outer surface begins at a selected axial plane through the core nozzle and ends at a trailing edge of the core nozzle.

19. The engine of claim 17, further comprising the axial cross-section of the core outer surface being non-axisymmetrical.

20. The engine of claim 17, wherein the engine is a turbofan engine for a jet aircraft; and
the core nozzle further comprises an inner surface such that a shape of the inner surface along a particular radial cross-section of the core aft portion differs from a particular curve of the core outer surface of the particular radial cross-section.

21. A method for reducing noise generated by an engine, the method comprising: operating the engine comprising a nozzle system comprising:
reducing, in response to forming a first shock-cell pattern in a first jet stream exiting from a first nozzle during operation of the engine during a cruise phase of a flight, a first noise associated with the first shock-cell pattern via the first nozzle comprising a first aft portion comprising a first outer surface comprising a first shape, wherein the first shape and a second shape of a second outer surface of a second aft portion of a second nozzle each comprises a wavy shape;
the second nozzle, at least partially surrounded by the first nozzle, comprising a first radial cross-section of the second outer surface comprising a first curve comprising a curvature varying from at least one other curve for a second radial cross-section of the second outer surface;
an axial cross-section of the second outer surface comprising a wavy shape; and
reducing, in response to forming a second shock-cell pattern in a second jet stream exiting the second nozzle during operation of the engine during the cruise phase of the flight, a second noise associated with the second shock-cell pattern via a plug comprising: a third shape comprising a wavy shape located downstream of the wavy shape of the second nozzle, and a plug aft portion comprising a plug outer surface comprising the third shape, wherein the plug comprises an interior passage that outlets a third jet stream.

22. The method of claim 21, wherein the step of operating the engine comprises:
operating the engine such that the first jet stream exits the first nozzle at a first supersonic speed and the second jet stream exits the second nozzle at one of: a second supersonic speed, and a subsonic speed; and
the second nozzle further comprising an inner surface comprising a shape of the inner surface along a particular radial cross-section of the second aft portion of the second nozzle differing from a particular curve of the second outer surface of the particular radial cross-section.

23. The method of claim 21, further comprising reducing the first noise associated with the first shock-cell pattern to within selected tolerances.

\* \* \* \* \*